United States Patent
Honea et al.

(10) Patent No.: US 8,411,712 B2
(45) Date of Patent: Apr. 2, 2013

(54) BEAM DIAGNOSTICS AND FEEDBACK SYSTEM AND METHOD FOR SPECTRALLY BEAM-COMBINED LASERS

(75) Inventors: Eric C. Honea, Seattle, WA (US); Donald R. Jander, Seattle, WA (US); Pratheepan Madasamy, Bothell, WA (US); Tolga Yilmaz, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 103 days.

(21) Appl. No.: 13/085,465

(22) Filed: Apr. 12, 2011

(65) Prior Publication Data

US 2011/0249692 A1   Oct. 13, 2011

Related U.S. Application Data

(60) Provisional application No. 61/343,947, filed on Apr. 12, 2010, provisional application No. 61/343,948, filed on Apr. 12, 2010, provisional application No. 61/343,945, filed on Apr. 12, 2010, provisional application No. 61/343,949, filed on Apr. 12, 2010, provisional application No. 61/343,946, filed on Apr. 12, 2010.

(51) Int. Cl.
  *H01S 3/13* (2006.01)
(52) U.S. Cl. .............. 372/29.011; 372/29.01; 372/6; 372/23
(58) Field of Classification Search ............ 372/29.011, 372/29.01, 6, 23
  See application file for complete search history.

(56) References Cited

U.S. PATENT DOCUMENTS

| | | | |
|---|---|---|---|
| 3,728,117 A | 4/1973 | Heidenhain et al. | |
| 4,200,846 A | 4/1980 | Stark et al. | |
| 4,278,902 A | 7/1981 | Loy et al. | |

(Continued)

FOREIGN PATENT DOCUMENTS

| | | |
|---|---|---|
| WO | WO 0049436 | 8/2000 |
| WO | WO 0060388 | 10/2000 |
| WO | PCTUS1131866 | 9/2011 |

OTHER PUBLICATIONS

Krause, J.T., et al., "Arc Fusion Splices With Near Pristine Strengths and Impoved Optical Loss", "22nd European Conference on Optical Communication", 1996, pp. 2.237-2.240.

(Continued)

*Primary Examiner* — Kinam Park
(74) *Attorney, Agent, or Firm* — Charles A. Lemaire; Jonathan M. Rixen; Lemaire Patent Law Firm, P.L.L.C.

(57) ABSTRACT

Apparatus and method for control of lasers (which use an array of optical gain fibers) in order to improve spectrally beam-combined (SBC) laser beam quality along the plane of the SBC fiber array via spectral-to-spatial mapping of a portion of the spectrally beam-combined laser beams, detection of optical power in each of the spatially dispersed beams and feedback control of the lasers for wavelength-drift correction. The apparatus includes a diffractive element; a source of a plurality of substantially monochromatic light beams directed from different angles to a single location on the diffractive element, wherein the diffractive element spectrally combines the plurality of light beams into a single beam. A controller adjusts characteristics of the light beams if one of the light beams has become misadjusted. In some embodiments, the controller adjusts the wavelength tuning of the respective fiber laser.

20 Claims, 15 Drawing Sheets

U.S. PATENT DOCUMENTS

| | | | |
|---|---|---|---|
| 4,295,741 A | 10/1981 | Palma et al. |
| 4,313,648 A | 2/1982 | Yano et al. |
| 4,367,040 A | 1/1983 | Goto |
| 4,424,435 A | 1/1984 | Barnes, Jr. |
| 4,523,315 A | 6/1985 | Stone |
| 4,794,345 A | 12/1988 | Linford et al. |
| 4,847,479 A | 7/1989 | Clark et al. |
| 4,862,257 A | 8/1989 | Ulich |
| 4,895,790 A | 1/1990 | Swanson et al. |
| 5,052,780 A | 10/1991 | Klein |
| 5,243,448 A | 9/1993 | Banbury |
| 5,319,668 A | 6/1994 | Luecke |
| 5,323,404 A | 6/1994 | Grubb |
| 5,379,310 A | 1/1995 | Papen et al. |
| 5,440,416 A | 8/1995 | Cohen et al. |
| 5,526,155 A | 6/1996 | Knox et al. |
| 5,528,724 A | 6/1996 | Chang et al. |
| 5,581,640 A | 12/1996 | Pan et al. |
| 5,588,078 A | 12/1996 | Cheng et al. |
| 5,608,826 A | 3/1997 | Boord et al. |
| 5,642,447 A | 6/1997 | Pan et al. |
| 5,661,835 A | 8/1997 | Kato et al. |
| 5,802,236 A | 9/1998 | DiGiovanni et al. |
| 5,815,518 A | 9/1998 | Reed et al. |
| 5,818,630 A | 10/1998 | Fermann et al. |
| 5,838,700 A | 11/1998 | Dianov et al. |
| 5,847,863 A | 12/1998 | Galvanauskas et al. |
| 5,859,945 A | 1/1999 | Kato et al. |
| 5,867,305 A | 2/1999 | Waarts et al. |
| 5,907,436 A | 5/1999 | Perry et al. |
| 5,912,910 A | 6/1999 | Sanders et al. |
| 5,930,030 A | 7/1999 | Scifres |
| 5,974,060 A | 10/1999 | Byren et al. |
| 6,014,249 A | 1/2000 | Fermann et al. |
| 6,023,361 A | 2/2000 | Ford |
| 6,028,879 A | 2/2000 | Ershov |
| 6,031,952 A | 2/2000 | Lee |
| 6,053,640 A | 4/2000 | Miyokawa et al. |
| 6,061,170 A | 5/2000 | Rice et al. |
| 6,072,931 A | 6/2000 | Yoon et al. |
| 6,081,635 A | 6/2000 | Hehmann |
| 6,097,863 A | 8/2000 | Chowdhury |
| 6,122,110 A | 9/2000 | Park et al. |
| 6,163,552 A | 12/2000 | Engelberth et al. |
| 6,163,554 A | 12/2000 | Chang et al. |
| 6,181,465 B1 | 1/2001 | Grubb et al. |
| 6,188,817 B1 | 2/2001 | Goodfellow |
| 6,192,062 B1 | 2/2001 | Sanchez-Rubio et al. |
| 6,208,679 B1 | 3/2001 | Sanchez-Rubio et al. |
| 6,212,310 B1 * | 4/2001 | Waarts et al. | 385/24 |
| 6,226,077 B1 | 5/2001 | Dunne |
| 6,275,623 B1 | 8/2001 | Brophy et al. |
| 6,295,304 B1 | 9/2001 | Koch et al. |
| 6,301,271 B1 | 10/2001 | Sanders et al. |
| 6,310,899 B1 | 10/2001 | Jacobvitz-Veselka et al. |
| 6,327,292 B1 | 12/2001 | Sanchez-Rubio et al. |
| 6,330,523 B1 | 12/2001 | Kacyra et al. |
| 6,339,662 B1 | 1/2002 | Koteles et al. |
| 6,381,008 B1 | 4/2002 | Branagh et al. |
| 6,381,388 B1 | 4/2002 | Epworth et al. |
| 6,400,495 B1 | 6/2002 | Zayhowski |
| 6,407,855 B1 | 6/2002 | MacCormack et al. |
| 6,418,152 B1 | 7/2002 | Davis |
| 6,426,965 B1 | 7/2002 | Chang et al. |
| 6,434,172 B1 | 8/2002 | DiGiovanni et al. |
| 6,456,756 B1 * | 9/2002 | Mead et al. | 385/24 |
| 6,490,381 B1 | 12/2002 | Adair et al. |
| 6,496,301 B1 | 12/2002 | Koplow et al. |
| 6,501,782 B1 | 12/2002 | Farmer |
| 6,584,133 B1 | 6/2003 | Walker et al. |
| 6,625,180 B2 | 9/2003 | Bufetov et al. |
| 6,625,364 B2 | 9/2003 | Johnson et al. |
| 6,631,234 B1 | 10/2003 | Russell et al. |
| 6,665,471 B1 | 12/2003 | Farmer et al. |
| 6,697,192 B1 | 2/2004 | Fan et al. |
| 6,697,414 B1 | 2/2004 | Kato et al. |
| 6,717,655 B2 | 4/2004 | Cheng et al. |
| 6,754,006 B2 | 6/2004 | Barton et al. |
| 6,765,724 B1 | 7/2004 | Kramer |
| 6,798,960 B2 | 9/2004 | Hamada |
| 6,807,338 B2 | 10/2004 | Bouteiller et al. |
| 6,819,871 B1 | 11/2004 | Baldwin et al. |
| 6,822,796 B2 | 11/2004 | Takada et al. |
| 6,829,421 B2 | 12/2004 | Forbes et al. |
| 6,836,607 B2 | 12/2004 | Dejneka et al. |
| 6,845,108 B1 | 1/2005 | Liu et al. |
| 6,845,204 B1 | 1/2005 | Broeng et al. |
| 6,865,344 B1 | 3/2005 | Johnson et al. |
| 6,868,099 B1 | 3/2005 | Walker et al. |
| 6,882,431 B2 | 4/2005 | Teich et al. |
| 6,901,197 B2 | 5/2005 | Hasegawa et al. |
| 6,914,916 B2 | 7/2005 | Pezeshki et al. |
| 6,917,631 B2 | 7/2005 | Richardson et al. |
| 6,937,795 B2 | 8/2005 | Squires et al. |
| 6,950,692 B2 | 9/2005 | Gelikonov et al. |
| 6,952,510 B1 | 10/2005 | Karlsen et al. |
| 6,958,859 B2 | 10/2005 | Hoose et al. |
| 6,959,021 B2 | 10/2005 | Po et al. |
| 6,960,027 B1 | 11/2005 | Krah et al. |
| 6,963,354 B1 | 11/2005 | Scheps |
| 6,996,343 B2 | 2/2006 | Neilson |
| 7,019,907 B2 | 3/2006 | Verdiell |
| 7,042,916 B2 | 5/2006 | Borne et al. |
| 7,043,127 B2 | 5/2006 | Hasegawa et al. |
| 7,065,107 B2 | 6/2006 | Hamilton et al. |
| 7,072,369 B2 | 7/2006 | Matsushita et al. |
| 7,072,553 B2 | 7/2006 | Johnson et al. |
| 7,106,932 B2 | 9/2006 | Birks et al. |
| 7,113,327 B2 | 9/2006 | Gu et al. |
| 7,734,189 B2 | 6/2010 | Ranganath |
| 7,747,174 B2 | 6/2010 | Ranganath |
| 7,821,900 B2 | 10/2010 | Rothenberg |
| 2007/0229939 A1 * | 10/2007 | Brown et al. | 359/341.1 |
| 2008/0179634 A1 | 7/2008 | Takiguchi |
| 2009/0324170 A1 | 12/2009 | Cheung et al. |
| 2010/0290106 A1 | 11/2010 | Digiovanni et al. |

OTHER PUBLICATIONS

Augst, S.J., et al., "Wavelength beam combining of ytterbium fiber lasers", "Opt. Lett.", 2003, pp. 331-333, vol. 28, No. 5.

Blazephotonics (Company), "Hollow Core Photonic Bandgap Fiber HC-580-01 Product Description", "http://www.crystal-fibre.com/datasheets/HC-580-01.pdf", Feb. 10, 2006.

Blazephotonics (Company), "High NA Multimode Fiber MM-37-01 Product Description", "http://www.crystal-fibre.com/datasheets/MM-37-01.pdf", 2005.

Brooks, Christopher D, et al., "1-mJ energy, 1-MW peak-power, 10-W averagepower, spectrally narrow, diffraction-limited pulses from a photonic-crystal f", "Optics Express", Oct. 31, 2005, pp. 8999-9002, vol. 13, No. 22.

Champert, P.A., et al., "3.5 W frequency-doubled fiber-based laser source at 772 nm", "Applied Physics Letters", Apr. 23, 2001, pp. 2420-2421, vol. 78, No. 17.

Chen et al., "Laser-to-Fiber Coupling Scheme by Utilizing a Lensed Fiber Integrated with a Long-Period Fiber Grating", "IEEE Photonics Technology Letters", May 2000, pp. 501-503, vol. 12, No. 5.

Cooper, L.J., et al., "High-power Yb-doped multicore ribbon fiber laser", Nov. 1, 2005, pp. 2906-2908, vol. 30, No. 21.

Crystal Fibre (Company), "High-Power Fiber Laser and Amplifier Subassembly Modules Product Description", "http://www.crystal-fibre.com/products/subassemblies.shtm", 2005 (copyright).

Crystal Fibre (Company), "Multimode Ultra High NA Photonic Crystal Fiber MM-HNA-110 Product Description", "http://www.crystal-fibre.com/datasheets/MM-HNA-110.pdf", Apr. 2005.

Crystal Fibre (Company), "Multimode Ultra High NA Photonic Crystal Fiber MM-HNA-200 Product Description", "http://www.crystal-fibre.com/datasheets/MM-HNA-200.pdf", Apr. 2005.

Crystal Fibre (Company), "Multimode Ultra High NA Photonic Crystal Fiber MM-HNA-35 Product Description", "http://www.crystal-fibre.com/datasheets/MM-HNA-35.pdr", Apr. 2005.

Crystal Fibre (Company), "Multimode Ultra High NA Photonic Crystal Fiber MM-HNA-5 Product Description", "http://www.crystal-fibre.com/datasheets/MM-HNA-5.pdf", Apr. 2005.

Crystal Fibre (Company), "Towards 100 kW fiber laser systems Scaling up power in fiber lasers for beam combining", "http://www.crystal-fibre.com/support/White_Paper_-_Towards_100kW_fiber_laser_systems_-_Scaling_up_power_in_fiber_lasers_for_beam_combining.pdf", Feb. 28, 2006.

Davitt, Kristina, et al., "290 and 340 nm UV LED arrays for fluorescence detection from single airborne particles", "Optics Express", Nov. 14, 2005, pp. 9548-9555, vol. 13, No. 23.

Di Teodoro, Fabio, et al., "Harmonic generation of an Yb-doped photonic-crystal fiber amplifier to obtain 1ns pulses of 410, 160, and 190kW peak-pow", "Advanced Solid-State Photonics 29 Technical Digest, Paper ME3", 2006.

Di Teodoro, Fabio, et al., "Diffraction-limited, 300-kW peak-power pulses from a coiled multimode fiber amplifier", "Optics Letters", Apr. 1, 2002, pp. 518-520, vol. 27, No. 7.

Di Teodoro, Fabio, et al., "1.1 MW peak-power, 7 W average-power, high-spectral-brightness, diffraction-limited pulses from a photonic crystal fiber", "Optics Letters", Oct. 15, 2005, pp. 2694-2696, vol. 30, No. 20.

Dunne, Mike, "Laser-driven particle accelerators", "Science", Apr. 21, 2006, pp. 374-376, vol. 312.

Emori, et al., "High-power Cascaded Raman Fiber Laser with 41-W output power at 1480-nm band", "Optical Society of America", May 2007, pp. 1-2.

Fan, T.Y., "Laser Beam Combining for High-Power, High Radiance Sources", "IEEE Journal of Selected Topics in Quantum Electronics", 2005, pp. 567-577, vol. 11.

Furusawa, et al., "Cladding pumped Ytterbium-doped fiber laser with holey inner and outer cladding.", "Optics Express", Dec. 17, 2001, pp. 714-720, vol. 9, No. 13.

Galvanauskas, A., et al., "Fiber-Laser-Based Femtosecond Parametric Generator in Bulk Periodically Poled LiNbO3", "Optics Letters", Jan. 15, 1997, pp. 105-107, vol. 22, No. 2.

Galvanauskas, Almantas, "Mode-scalable fiber-based chirped pulse amplification systems", "IEEE Journal on Selected Topics in Quantum Electronics", Jul. 2001, pp. 504-517, vol. 7, No. 4.

Blaze Photonics (Crystal Fibre Company), "HC-580-01 'yellow' Hollow Core Photonic Bandgap Fiber", "http://www.crystal-fibre.com/datasheets/HC-580-01.pdr", Feb. 10, 2006.

Hehl, Karl, et al., "High-efficiency dielectric reflection gratings: design, fabrication, and analysis", "Appl. Opt.", 1999, pp. 6257-6271, vol. 38.

Henderson, Angus, et al., "Low threshold, singly-resonant CW OPO pumped by an all-fiber pump source", "Optics Express", Jan. 3, 2006, pp. 767-772, vol. 14, No. 2.

Krause, J.T., et al., "Arc Fusion Splices with Near Pristine Strengths and Improved Optical Loss", "22nd European Conference on Optical Communication—EEOC'96, Oslo, Norway", 1996, pp. 237-240, vol. 2.

Kristiansen, Rene E., et al., "Microstructured fibers and their applications", "Proceedings of the 4th Reunion Espanola of Optoelectronics (OPTOEL), Cl-5", 2005, pp. 37-49.

Liem, A., et al., "100-W single-frequency master-oscillator fiber power amplifier", "Optics Letters", Sep. 1, 2003, pp. 1537-1539, vol. 28, No. 17.

Limpert, J., et al., "High power Q-switched Yb-doped photonic crystal fiber laser producing sub-10 ns. pulses", "Appl. Phys. B 81", 2005, pp. 19-21.

Limpert, J., et al., "High-power rod-type photonic crystal fiber laser", "Optics Express", Feb. 21, 2005, pp. 1055-1058, vol. 13, No. 4.

Limpert, J., et al., "Low-nonlinearity single-transverse-mode ytterbium-doped photonic crystal fiber amplifier", "Optics Express", Apr. 5, 2004, pp. 1313-1319, vol. 12, No. 7.

Liu, F., et al., "Cost-effective wavelength selectable light source using DFB fibre laser array", "Electronics Letters", Mar. 30, 2000, pp. 620-621, vol. 36, No. 7.

Liu, A., et al., "Spectral beam combining of high power fiber lasers", "Proceedings of SPIE", Jun. 7, 2004, pp. 81-88, vol. 5335.

Miguelez, et al., "Optical Segmentation Technology Alternative and Architectures", "Motorola", 2008, pp. 1-12.

Moutzouris, Konstantinos, et al., "Highly efficient second, third and fourth harmonic generation from a two-branch femtosecond erbium fiber source", "Optics Express", Mar. 6, 2006, pp. 1905-1912, vol. 14, No. 5.

Perry, M.D., et al., "High-efficiency multilayer dielectric diffraction gratings", "Opt. Lett.", 1995, pp. 940-942, vol. 20.

Roser, F., et al., "131 W 220 fs fiber laser system", "Optics Letters", Oct. 15, 2005, pp. 2754-2756, vol. 30, No. 20.

Schreiber, T., et al., "Stress-induced single-polarization single-transverse mode photonic crystal fiber with low nonlinearity", "Optics Express", Sep. 19, 2005, pp. 7621-7630, vol. 13, No. 19.

"Sensor Systems for Biological Agent Attacks: Protecting Buildings and Military Bases", 2005, p. 73 Publisher: Committee on Materials and Manufacturing Processes for Advanced Sensors, National Research Council.

Sorensen, T., et al., "Metal-assisted coupling to hollow-core photonic crystal fibres", "Electronics Letters", Jun. 9, 2005, vol. 41, No. 12.

Tunnermann, A., et al., "The renaissance and bright future of fibre lasers", "Journal of Physics B: Atomic, Molecular and Optical Physics", 2005, pp. S681-S693, vol. 38.

* cited by examiner

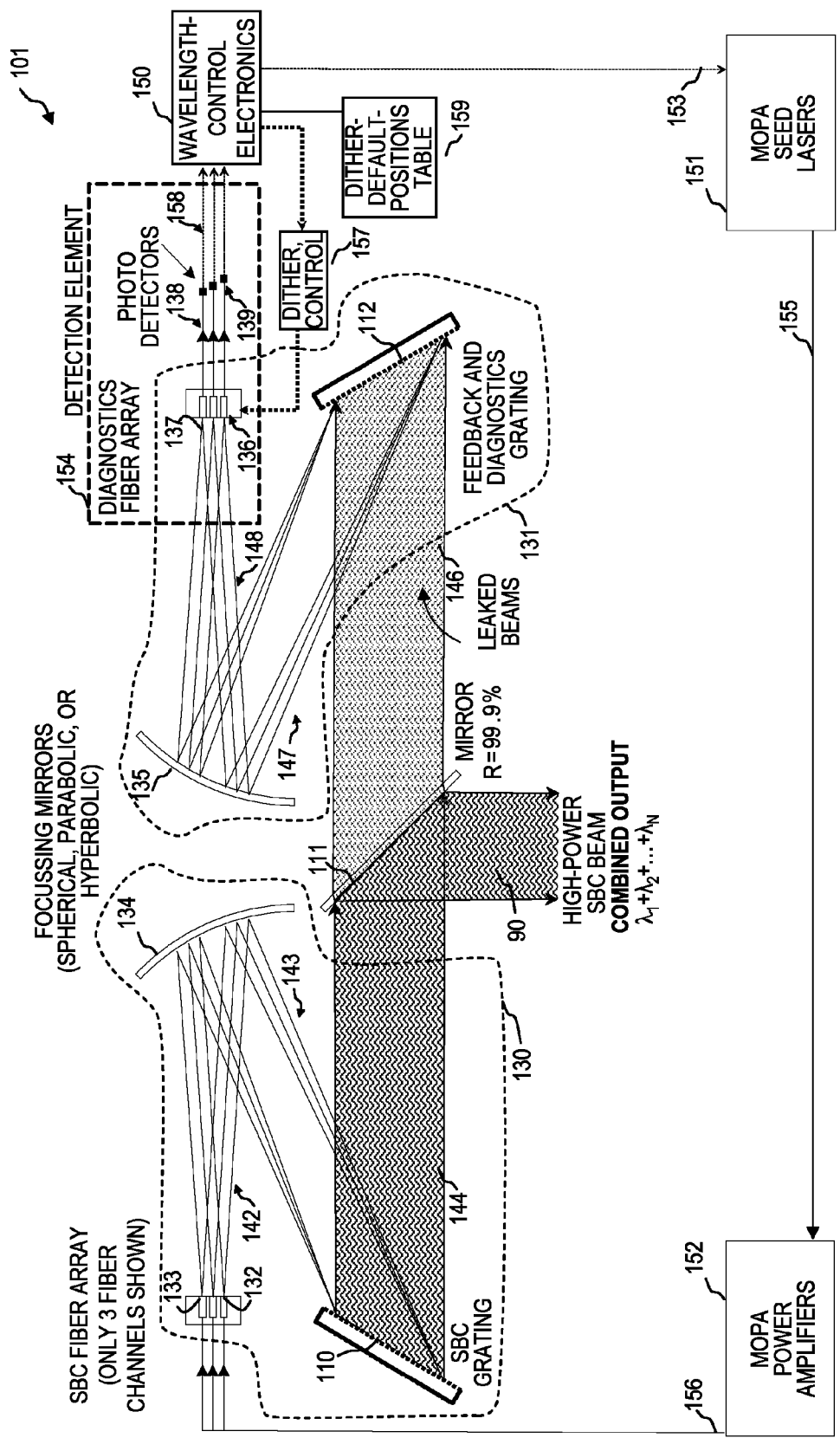
FIG. 1A1

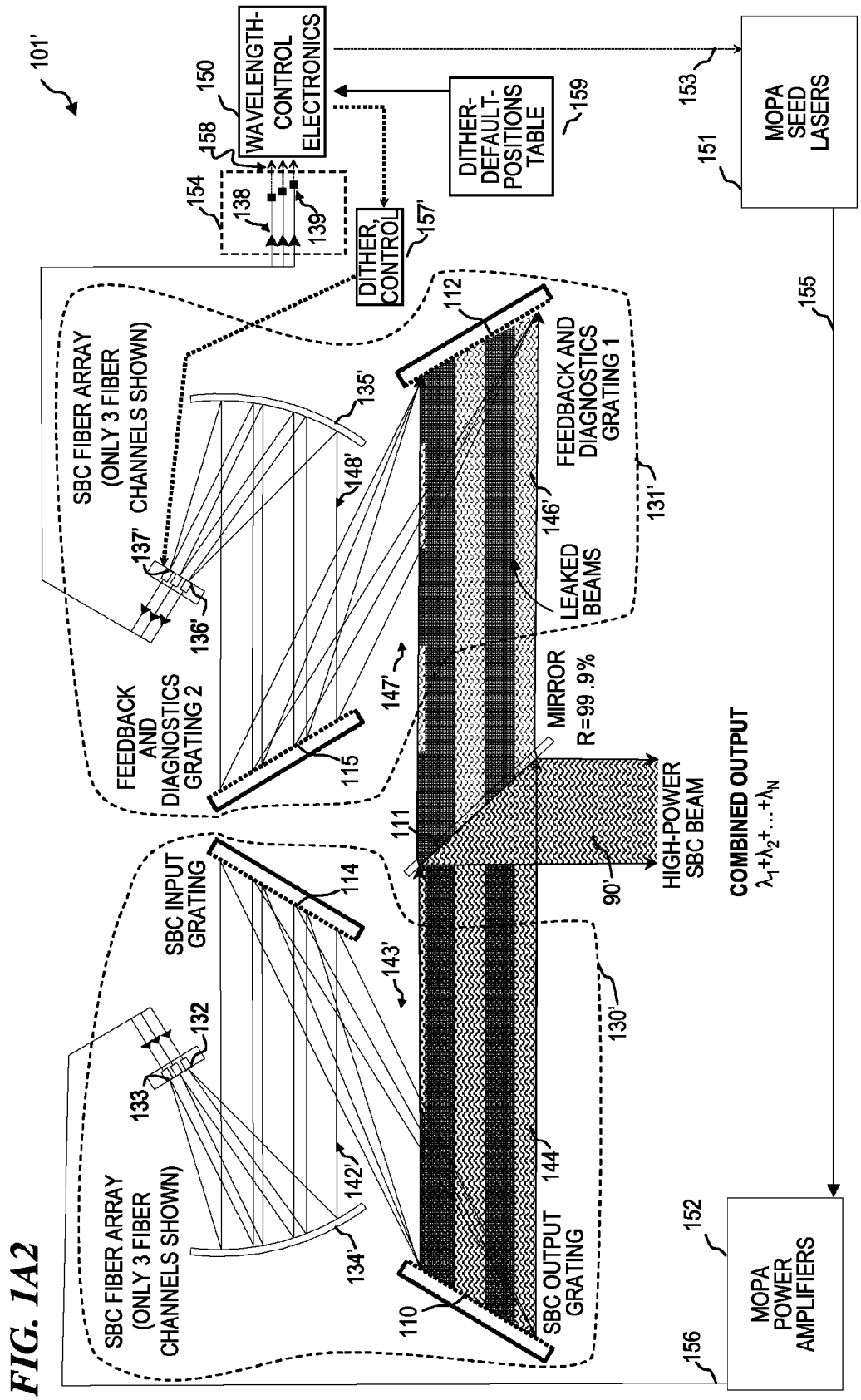
FIG. 1A2

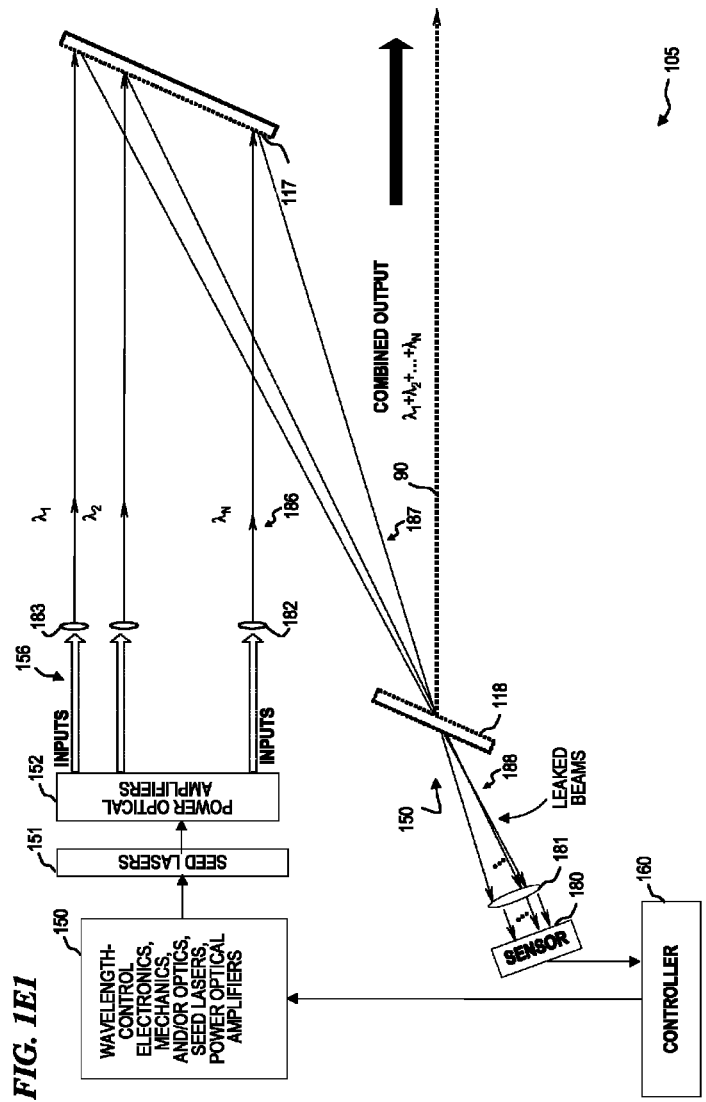

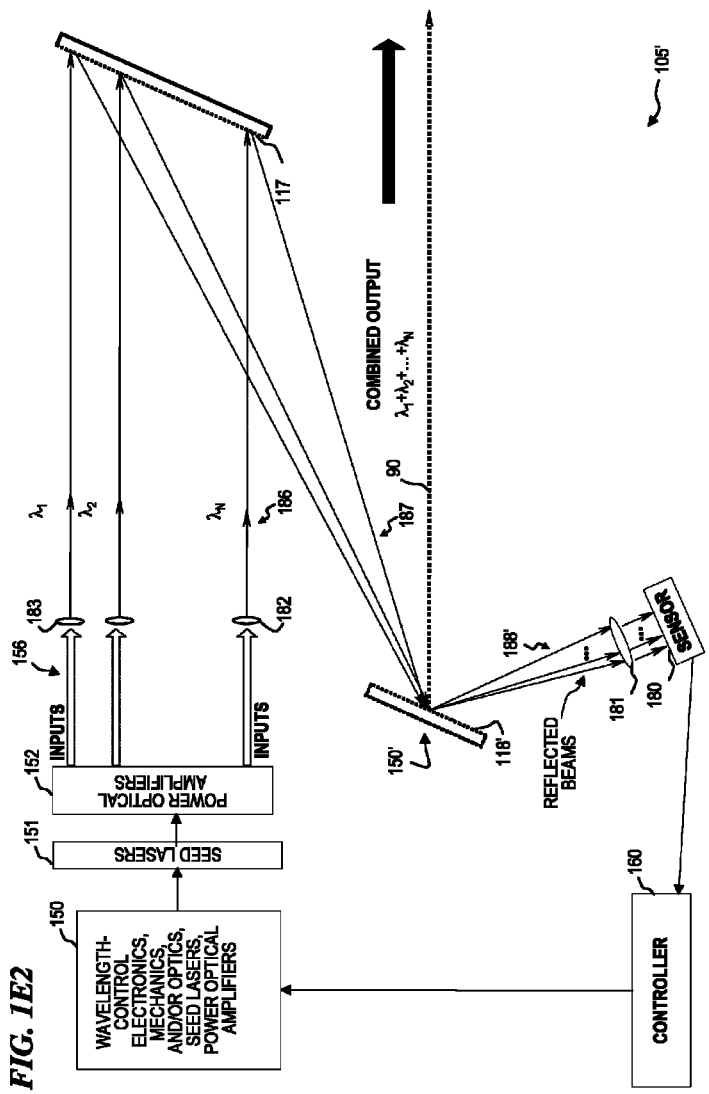
FIG. 1E2

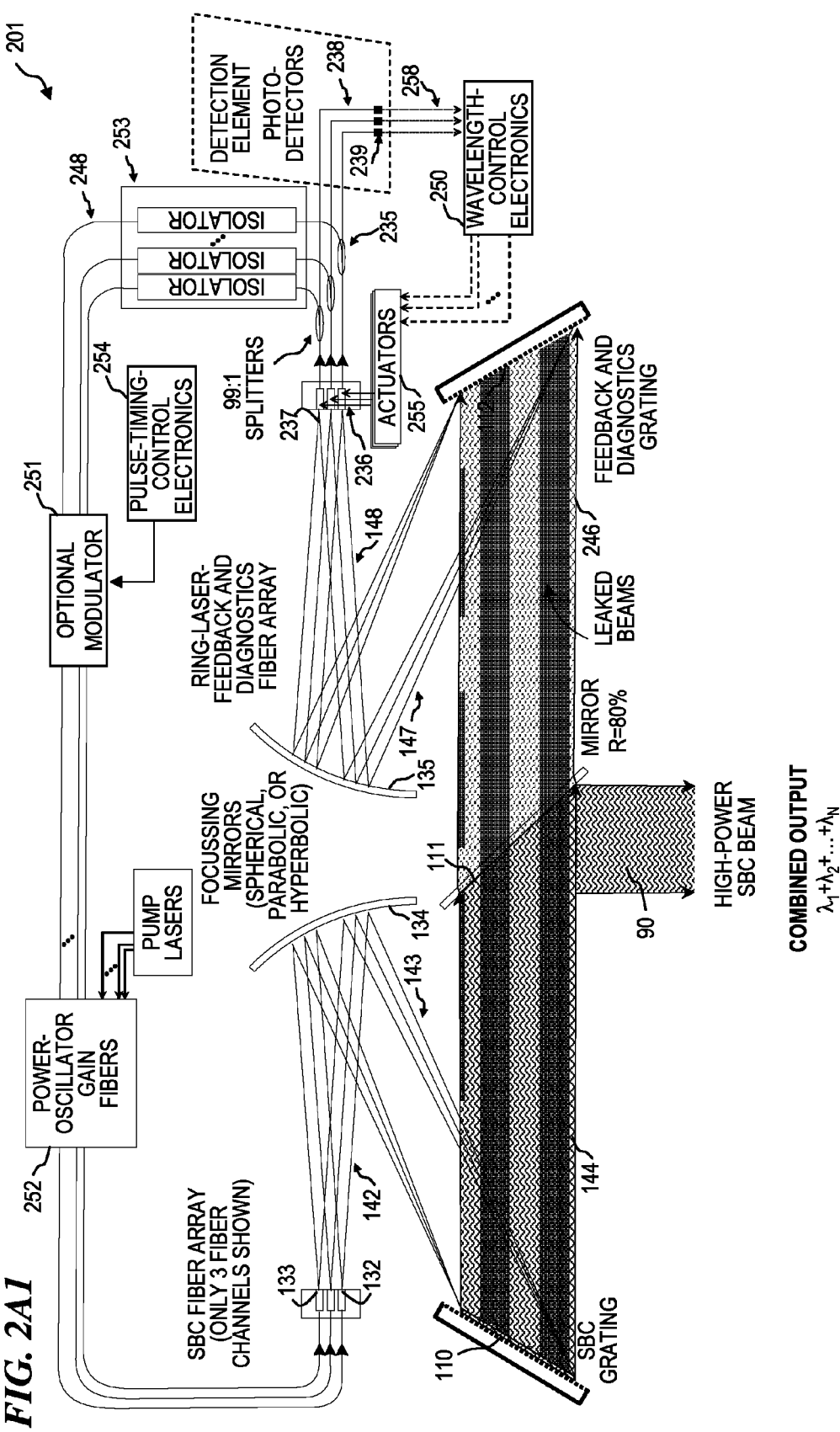
FIG. 2A1

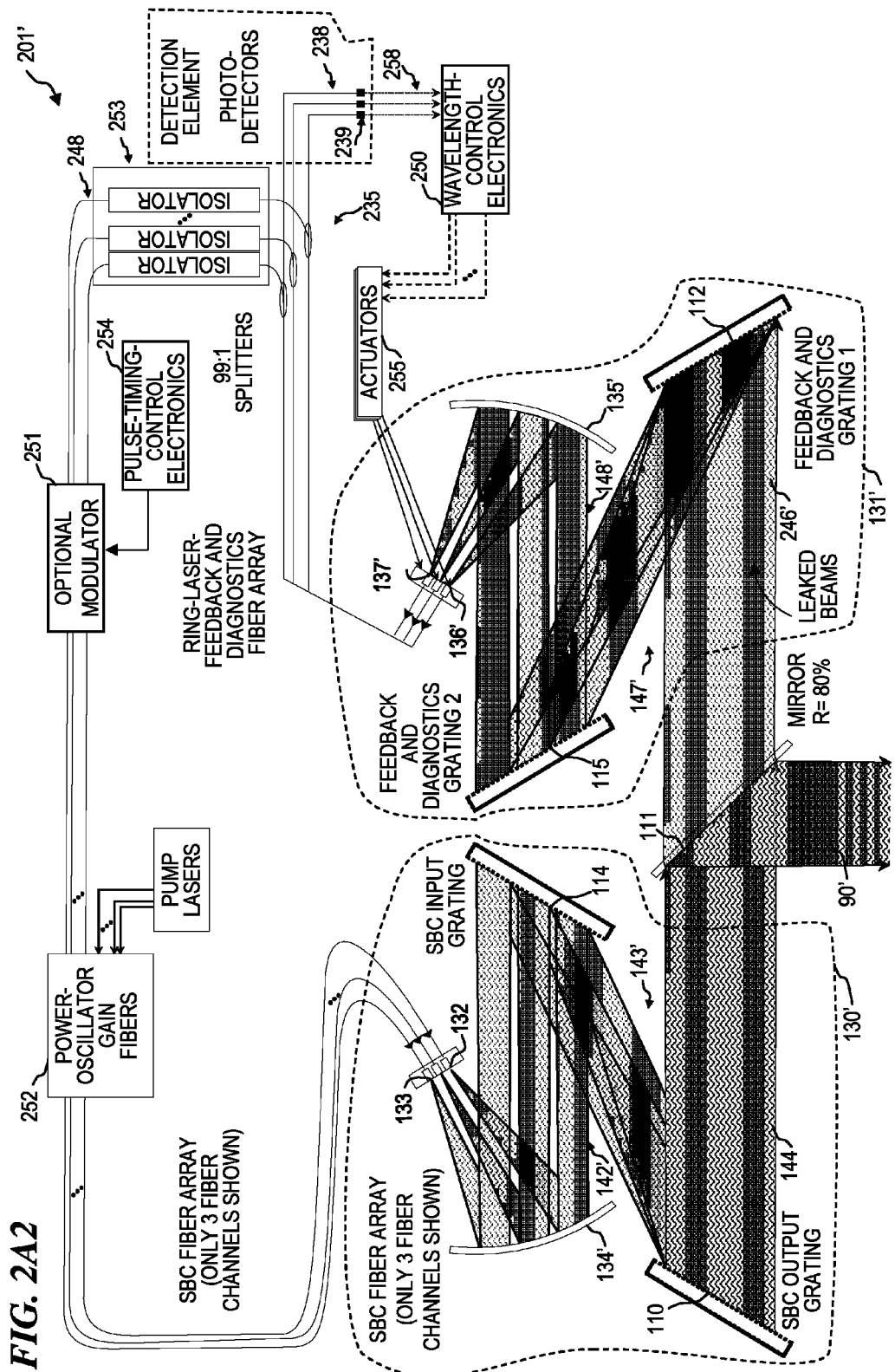
FIG. 2A2

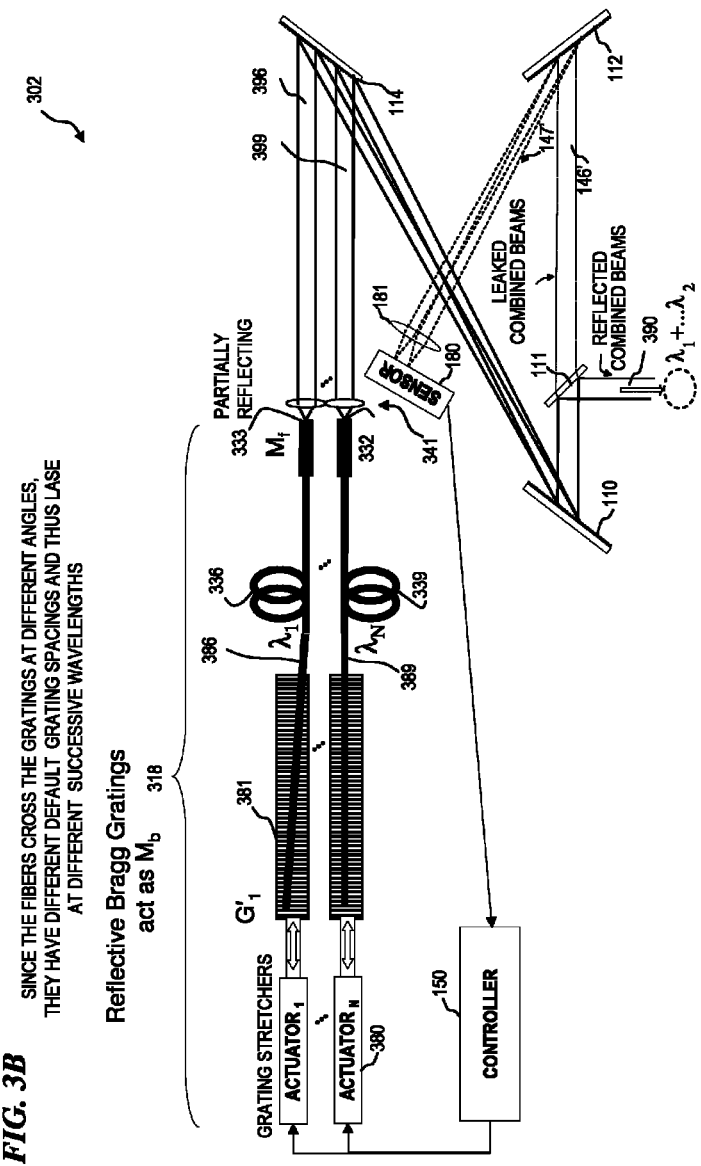

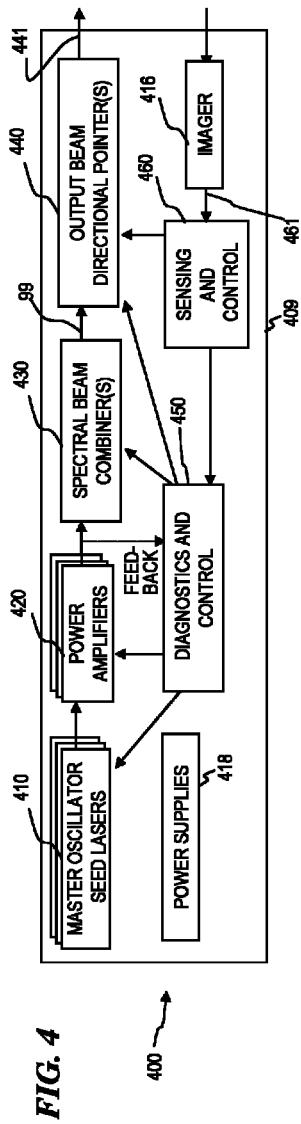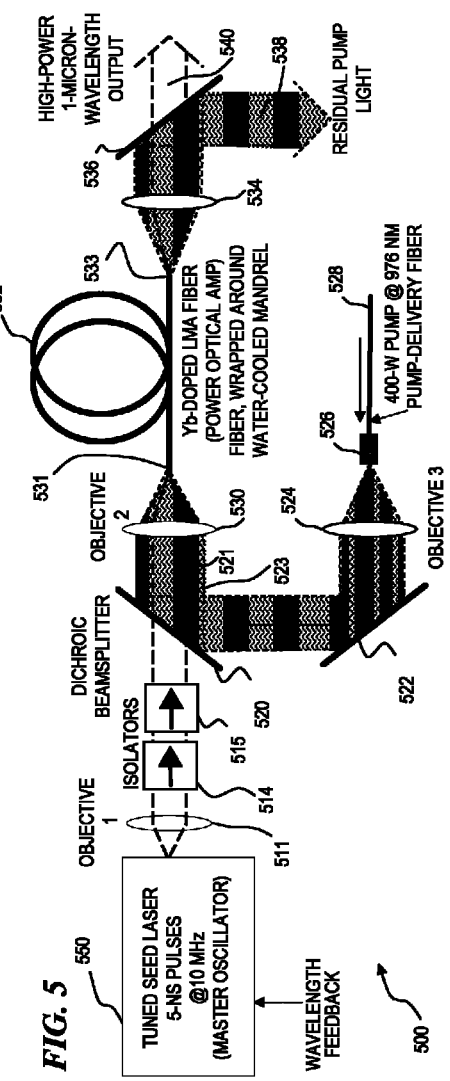

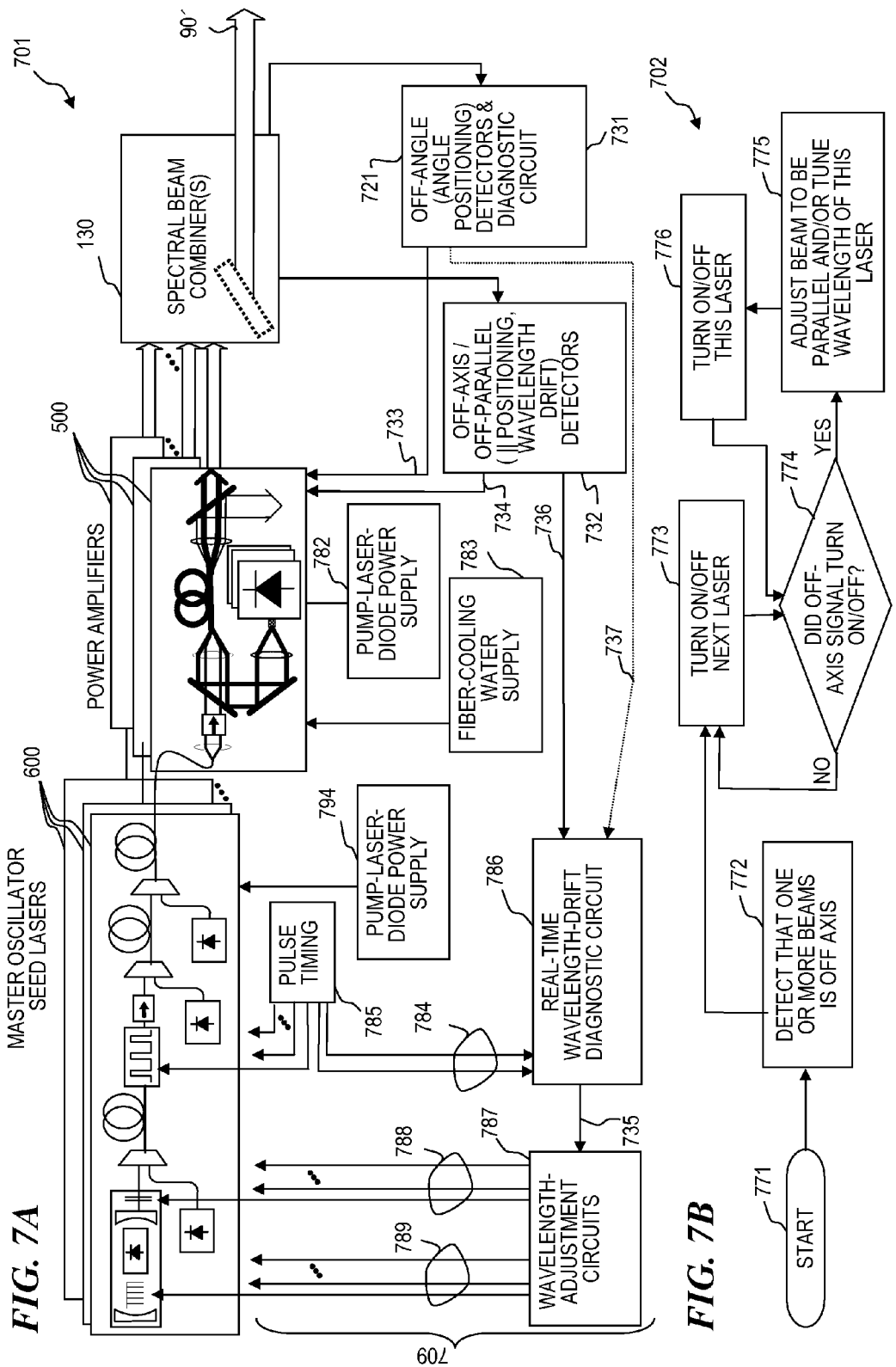

BEAM DIAGNOSTICS AND FEEDBACK SYSTEM AND METHOD FOR SPECTRALLY BEAM-COMBINED LASERS

CROSS-REFERENCE TO RELATED APPLICATIONS

This application claims priority benefit under 35 U.S.C. §119(e) to:

U.S. Provisional Patent Application No. 61/343,947 filed Apr. 12, 2010, by Matthias P. Savage-Leuchs, titled "HIGH-POWER LASER SYSTEM HAVING DELIVERY FIBER WITH NON-CIRCULAR CROSS SECTION FOR ISOLATION AGAINST BACK REFLECTIONS";

U.S. Provisional Patent Application No. 61/343,948 filed Apr. 12, 2010, by Matthias P. Savage-Leuchs, titled "HIGH BEAM QUALITY AND HIGH AVERAGE POWER FROM LARGE-CORE-SIZE OPTICAL-FIBER AMPLIFIERS; SIGNAL AND PUMP MODE-FIELD ADAPTOR FOR DOUBLE-CLAD FIBERS AND ASSOCIATED METHOD";

U.S. Provisional Patent Application No. 61/343,945 filed Apr. 12, 2010, by Yongdan Hu et al., titled "APPARATUS FOR OPTICAL FIBER MANAGEMENT AND COOLING";

U.S. Provisional Patent Application No. 61/343,949 filed Apr. 12, 2010, by Yongdan Hu, titled "METHOD AND APPARATUS FOR IN-LINE FIBER-CLADDING-LIGHT DISSIPATION"; and U.S. Provisional Patent Application No. 61/343,946 filed Apr. 12, 2010, by Tolga Yilmaz et al., titled "BEAM DIAGNOSTICS AND FEEDBACK SYSTEM AND METHOD FOR SPECTRALLY BEAM-COMBINED LASERS";

each of which is incorporated herein by reference in its entirety.

This invention is also related to:

P.C.T. Patent Application PCT/US2011/031865 titled "HIGH-POWER LASER SYSTEM HAVING DELIVERY FIBER WITH NON-CIRCULAR CROSS SECTION FOR ISOLATION AGAINST BACK REFLECTIONS" filed on Apr. 9, 2011 by Matthias P. Savage-Leuchs;

P.C.T. Patent Application PCT/US2011/031864 titled "HIGH BEAM QUALITY AND HIGH AVERAGE POWER FROM LARGE-CORE-SIZE OPTICAL-FIBER AMPLIFIERS" filed on Apr. 9, 2011 by Matthias P. Savage-Leuchs and Christian E. Dilley;

P.C.T. Patent Application PCT/US2011/031863 titled "SIGNAL AND PUMP MODE-FIELD ADAPTOR FOR DOUBLE-CLAD FIBERS AND ASSOCIATED METHOD" filed on Apr. 9, 2011 by Matthias P. Savage-Leuchs and Christian E. Dilley;

P.C.T. Patent Application PCT/US2011/031866 titled "BEAM DIAGNOSTICS AND FEEDBACK SYSTEM AND METHOD FOR SPECTRALLY BEAM-COMBINED LASERS" filed on Apr. 9, 2011 by Matthias P. Savage-Leuchs and Christian E. Dilley;

U.S. Pat. No. 7,620,077 issued Nov. 17, 2009, to Angus J. Henderson, titled "APPARATUS AND METHOD FOR PUMPING AND OPERATING OPTICAL PARAMETRIC OSCILLATORS USING DFB FIBER LASERS";

U.S. Pat. No. 7,701,987 issued Apr. 20, 2010, to Matthias P. Savage-Leuchs et al., titled "APPARATUS AND METHOD FOR GENERATING CHIRP-SLICE CONTROLLED-LINEWIDTH LASER-SEED SIGNALS";

U.S. Pat. No. 7,471,705 issued Dec. 30, 2008, to David C. Gerstenberger et al., titled "ULTRAVIOLET LASER SYSTEM AND METHOD HAVING WAVELENGTH IN THE 200-NM RANGE";

U.S. Provisional Patent Application No. 60/703,824 filed on Jul. 29, 2005, titled "PERIODIC FIBER TO SUPPRESS NONLINEAR EFFECTS IN RARE-EARTH-DOPED FIBER AMPLIFIERS AND LASERS";

U.S. Pat. No. 7,386,211 issued Jun. 10, 2008, to Fabio Di Teodoro et al., titled "METHOD AND APPARATUS FOR SPECTRAL-BEAM COMBINING OF MEGA-WATT-PEAK-POWER BEAMS FROM PHOTONIC-CRYSTAL RODS";

U.S. Pat. No. 7,671,337 issued Mar. 2, 2010, to Steven C. Tidwell, titled "SYSTEM AND METHOD FOR POINTING A LASER BEAM";

U.S. Provisional Patent Application No. 60/647,747 on Jan. 26, 2005, by Anping Liu, titled "SPECTRAL BEAM COMBINING OF HIGH POWER FIBER LASERS";

U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS";

U.S. Pat. No. 7,768,700 issued Aug. 3, 2010, to Matthias P. Savage-Leuchs, titled "METHOD AND APPARATUS FOR OPTICAL GAIN FIBER HAVING SEGMENTS OF DIFFERING CORE SIZES";

U.S. Patent Publication No. 2008/0077200 filed Sep. 28, 2006, by Mark P. Bendett et al., titled "APPARATUS AND METHOD FOR STIMULATION OF NERVES AND AUTOMATED CONTROL OF SURGICAL INSTRUMENTS";

U.S. Pat. No. 7,872,794 issued Jan. 18, 2011, to John D. Minelly et al., titled "HIGH-ENERGY EYE-SAFE PULSED FIBER AMPLIFIERS AND SOURCES OPERATING IN ERBIUM'S L-BAND";

U.S. Pat. No. 7,876,803 issued Jan. 25, 2011, to Di Teodoro et al., titled "HIGH-POWER, PULSED RING FIBER OSCILLATOR AND METHOD";

U.S. Pat. No. 7,876,498 issued Jan. 25, 2011, to Eric C. Honea et al., titled "PULSE-ENERGY-STABILIZATION APPROACH AND FIRST-PULSE-SUPPRESSION METHOD USING FIBER AMPLIFIER";

U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS" (which issued as U.S. Pat. No. 8,179,594 on May 15, 2012);

U.S. patent application Ser. No. 12/624,327 filed Nov. 23, 2009, by Roy D. Mead, titled "SPECTRALLY BEAM COMBINED LASER SYSTEM AND METHOD AT EYE-SAFER WAVELENGTHS";

U.S. Provisional Patent Application No. 61/263,736 filed Nov. 23, 2009, by Matthias P. Savage-Leuchs et al., titled "Q-SWITCHED OSCILLATOR SEED-SOURCE FOR MOPA LASER ILLUMINATOR METHOD AND APPARATUS";

U.S. patent application Ser. No. 12/952,190 filed Nov. 22, 2010, by Matthias P. Savage-Leuchs et al., titled "Q-SWITCHED OSCILLATOR SEED-SOURCE FOR MOPA LASER ILLUMINATOR METHOD AND APPARATUS";

U.S. patent application Ser. No. 12/854,868 filed Aug. 11, 2010, by Tolga Yilmaz et al., titled "IN-LINE FORWARD/BACKWARD FIBER-OPTIC SIGNAL ANALYZER";

U.S. patent application Ser. No. 12/953,292 filed Nov. 23, 2010, by Yongdan Hu et al., titled "APPARATUS FOR OPTICAL FIBER MANAGEMENT AND COOLING"; and U.S. patent application Ser. No. 12/793,508 filed Jun. 3, 2010, by Matthias P. Savage-Leuchs et al., titled "METHOD AND APPARATUS FOR IN-LINE FIBER-CLADDING-LIGHT DISSIPATION" (which issued as U.S. Pat. No. 8,355,608 on Jan. 15, 2013);

each of which is incorporated herein by reference in its entirety.

FIELD OF THE INVENTION

The present invention relates to optical waveguides and more particularly to a system and method for laser-beam diagnostics and feedback control of spectrally-beam-combined lasers, in order to detect and correct errors such as wavelength drift and the like.

BACKGROUND OF THE INVENTION

The broad gain bandwidth of conventional fiber-laser systems allows for operation over a wide range of wavelengths, or even tunable operation. For the simplest fiber-laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

In order to generate single beams of laser light with very high power levels, it is desirable to do spectral-beam combining (SBC) of a plurality of laser beams, such as described in U.S. Pat. No. 7,386,211 titled "METHOD AND APPARATUS FOR SPECTRAL-BEAM COMBINING OF MEGAWATT-PEAK-POWER BEAMS FROM PHOTONIC-CRYSTAL RODS" and U.S. Pat. No. 7,199,924 titled "APPARATUS AND METHOD FOR SPECTRAL-BEAM COMBINING OF HIGH-POWER FIBER LASERS," each of which is hereby incorporated by reference in its entirety. It is desirable to produce high peak and average powers from the fiber lasers and amplifiers used in SBC systems. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth-doped (RE-doped) double-clad fiber with a large core. The large core provides two benefits: spreading the light over a larger core decreases the intensity driving the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system. Stimulated Brillouin Scattering (SBS) is a well-known phenomenon that can lead to power limitations or even the destruction of a high-power fiber-laser system due to sporadic or unstable feedback, self-lasing, pulse compression and/or signal amplification.

U.S. Pat. No. 6,192,062, issued Feb. 20, 2001, to Sanchez-Rubio et al. titled "BEAM COMBINING OF DIODE LASER ARRAY ELEMENTS FOR HIGH BRIGHTNESS AND POWER" and U.S. Pat. No. 6,208,679, issued Mar. 27, 2001, to Sanchez-Rubio et al. titled "HIGH-POWER MULTI-WAVELENGTH EXTERNAL CAVITY LASER" describe the fundamental techniques of spectral beam combining, and both are incorporated herein by reference.

In some embodiments, the gratings used for spectral-beam combining are "blazed," i.e., formed with V-grooves having sidewall angles that are asymmetrical with respect to a vector normal to the overall surface of the grating. U.S. Pat. No. 3,728,117, issued Apr. 17, 1973, to Heidenhain et al., titled "OPTICAL DIFFRACTION GRID" (incorporated herein by reference), describes one method for making blazed gratings having asymmetric grooves. U.S. Pat. No. 4,895,790, issued Jan. 23, 1990, to Swanson et al., titled "HIGH-EFFICIENCY, MULTILEVEL, DIFFRACTIVE OPTICAL ELEMENTS" (incorporated herein by reference), describes a method for making blazed gratings having asymmetric grooves using binary photolithography to create stepped profiles. U.S. Pat. No. 6,097,863, issued Aug. 1, 2000, to Chowdhury, titled "DIFFRACTION GRATING WITH REDUCED POLARIZATION SENSITIVITY" (incorporated herein by reference), describes a reflective diffraction grating with reduced polarization sensitivity for dispersing the signals. The Chowdhury grating includes facets that are oriented for reducing efficiency variations within a transmission bandwidth and that are shaped for reducing differences between the diffraction efficiencies in two orthogonal directions of differentiation. U.S. Pat. No. 4,313,648 issued Feb. 2, 1982, to Yano et al., titled "PATTERNED MULTI-LAYER STRUCTURE AND MANUFACTURING METHOD"(incorporated herein by reference) describes a manufacturing method for a patterned (striped) multi-layer article.

U.S. Pat. No. 6,822,796 issued Nov. 23, 2004, to Takada et al., titled "DIFFRACTIVE OPTICAL ELEMENT" (incorporated herein by reference), describes a method for making blazed gratings having asymmetric grooves with dielectric coatings. U.S. Pat. No. 6,958,859, issued Oct. 25, 2005, to Hoose et al., titled "GRATING DEVICE WITH HIGH DIFFRACTION EFFICIENCY" (incorporated herein by reference), describes a method for making blazed gratings having dielectric coatings.

U.S. Pat. No. 5,907,436 titled "MULTILAYER DIELECTRIC DIFFRACTION GRATINGS" was issued May 25, 1999, to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 6,212,310 titled "HIGH POWER FIBER GAIN MEDIA SYSTEM ACHIEVED THROUGH POWER SCALING VIA MULTIPLEXING" was issued Apr. 3, 2001, to Waarts et al., and is incorporated herein by reference. This patent describes certain methods of power scaling by multiplexing multiple fiber gain sources with different wavelengths, pulsing or polarization modes of operation is achieved through multiplex combining of the multiple fiber gain sources to provide high power outputs, such as ranging from tens of watts to hundreds of watts, provided on a single mode or multimode fiber. One method described by Waarts et al. is similar to that shown in the present invention shown in FIG. 2A1, described below, where a plurality of input laser beams of differing wavelengths are directed at different angles to a diffraction grating, which diffracts the beams into a single output beam, however, this output beam necessarily has a wavelength linewidth-dependent chromatic divergence introduced by the grating. The present invention includes many distinguishing features not in Waarts et al.

There is a need for spectral-beam-combining (SBC) laser systems, particularly those employing fiber lasers and/or fiber optical amplifiers, wherein the output of each one of a plurality of beams is measured and, based on the measurements, feedback is provided to control the fiber lasers and/or fiber optical amplifiers.

BRIEF SUMMARY OF THE INVENTION

The present invention provides an apparatus and method for control of lasers (which use an array of optical-gain fibers) in order to improve spectrally beam-combined (SBC) laser beam quality along the plane of the SBC fiber array via spectral-to-spatial mapping of a portion of the spectrally beam-combined laser beams, detection of optical power in each of the spatially dispersed beams and feedback control of the lasers for wavelength-drift correction. The apparatus includes a diffractive element; a source of a plurality of substantially monochromatic light beams directed from different angles to a single location on the diffractive element, wherein the diffractive element spectrally combines the plurality of light beams into a single beam. A controller adjusts characteristics of the light beams if one of the light beams has become misaligned or the wavelength has drifted or some other characteristic (such as pump-laser power, overheating or the like) has become misadjusted.

In some embodiments, the present invention provides an apparatus that includes an output diffractive element; a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength different than the first central wavelength; a first adjustment apparatus configured to set an adjustable characteristic of the first light beam; a second adjustment apparatus configured to set an adjustable characteristic of the second light beam; a detector configured to detect whether one of the light beams has become misadjusted, wherein the detector includes a plurality of light sensors and an imaging device that focuses the plurality of light beams onto the plurality of light sensors; a diagnoser operatively connected to receive signals from the plurality of light sensors configured to determine whether the first light beam is the misadjusted one and if so, to control the first adjustment apparatus to adjust the adjustable characteristic of the first light beam in order that the first light beam becomes improved relative to the single combined beam. In some embodiments, the misadjustment being corrected is a misalignment of a fiber end. In some embodiments, the misadjustment being corrected is a wavelength drift of a laser signal wavelength. In some embodiments, the misadjustment being corrected is a power level of a fiber laser output. In some embodiments, the first light beam is a laser beam.

In some embodiments, the present invention provides a method that includes providing a plurality of fiber lasers that generate laser beams at a plurality of substantially monochromatic light wavelengths including a first fiber that generates a first laser beam at a first wavelength and a second fiber that generates a second laser beam at a second wavelength; spectrally combining the plurality of laser beams into a single output beam; setting an adjustable characteristic of the first fiber to generate the first laser beam at a first wavelength; setting an adjustable characteristic of the second fiber to generate the second laser beam at a second wavelength; detecting that one of the laser beams has become misadjusted relative to the single combined beam; determining that the first laser beam is the misadjusted one and if so, adjusting the adjustable characteristic of the first laser beam in order that the first laser beam is improved (more correctly adjusted relative to the others of the plurality of laser beams, e.g., adjusted such that the total power in the far-field of the single output beam is increased or maximized under the current operating conditions) relative to the single combined beam. In some embodiments, the misadjustment being corrected is a misalignment of a fiber end. In some embodiments, the misadjustment being corrected is a wavelength drift of a laser signal wavelength. In some embodiments, the misadjustment being corrected is a power level of a fiber laser output. In some embodiments, the setting of the adjustable characteristic includes wavelength tuning the respective fiber laser.

In some embodiments, the present invention provides an apparatus that includes an output diffractive element; a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength different than the first central wavelength; a first adjustment apparatus configured to set an adjustable characteristic of the first light beam; a second adjustment apparatus configured to set an adjustable characteristic of the second light beam; a detector configured to detect whether one of the light beams has become misaligned, wherein the detector includes a plurality of light sensors and an imaging device that focuses the plurality of light beams onto the plurality of light sensors; a diagnoser operatively connected to receive signals from the plurality of light sensors configured to determine whether the first light beam is the misaligned one and if so, to control the first adjustment apparatus to adjust the adjustable characteristic of the first light beam in order that the first light beam becomes aligned relative to the single combined beam.

In some embodiments, the present invention provides a method that includes providing a plurality of fiber lasers that generate laser beams at a plurality of substantially monochromatic light wavelengths including a first fiber that generates a first laser beam at a first wavelength and a second fiber that generates a second laser beam at a second wavelength; spectrally combining the plurality of laser beams into a single output beam; wavelength tuning the first fiber to generate the first laser beam at a first wavelength; wavelength tuning the second fiber to generate the second laser beam at a second wavelength; detecting that one of the laser beams has become misaligned relative to the single combined beam; determining that the first laser beam is the misaligned one; and adjusting the wavelength tuning of the first fiber in order that the first laser beam is aligned relative to the single combined beam.

BRIEF DESCRIPTION OF THE DRAWINGS

FIG. 1A1 is a block diagram of a system 101 that spectrally beam combines an array of laser beams and performs beam diagnostics and control, according to some embodiments of the present invention.

FIG. 1A2 is a block diagram of a system 101' that spectrally beam combines an array of laser beams with dispersion compensation and performs beam diagnostics and control, according to some embodiments of the present invention.

FIG. 1E1 is a diagram of a system 105 that spectrally beam combines an array of laser beams and performs beam diagnostics and control, according to some embodiments of the present invention.

FIG. 1E2 is a diagram of a system 105' that spectrally beam combines an array of laser beams and performs beam diagnostics and control, according to some embodiments of the present invention.

FIG. 2A1 is a diagram of a power-oscillator ring-laser SBC system 201 that spectrally beam combines an array of ring-laser beams and performs beam diagnostics and control, according to some embodiments of the present invention.

FIG. 2A2 is a diagram of a system 201' that spectrally beam combines an array of laser beams with dispersion compensation and performs beam diagnostics and control, according to some embodiments of the present invention.

FIG. 3B is a diagram of a system 302 that spectrally beam combines an array of laser beams and performs beam diagnostics and control, according to some embodiments of the present invention.

FIG. 4 is a schematic of a system 400 that spectrally beam combines an array of laser beams and performs beam diagnostics and control, according to some embodiments of the present invention.

FIG. 5 is a diagram of a MOPA laser subsystem's optical power-amplifier system 500, according to some embodiments of the present invention.

FIG. 7A is a diagram of a system 701 that spectrally beam combines an array of laser beams and performs beam diagnostics and control, according to some embodiments of the present invention.

FIG. 7B is a flowchart 702 describing diagnostics and control of an array of laser beams, according to some embodiments of the present invention.

DETAILED DESCRIPTION OF THE INVENTION

Figure 1B:
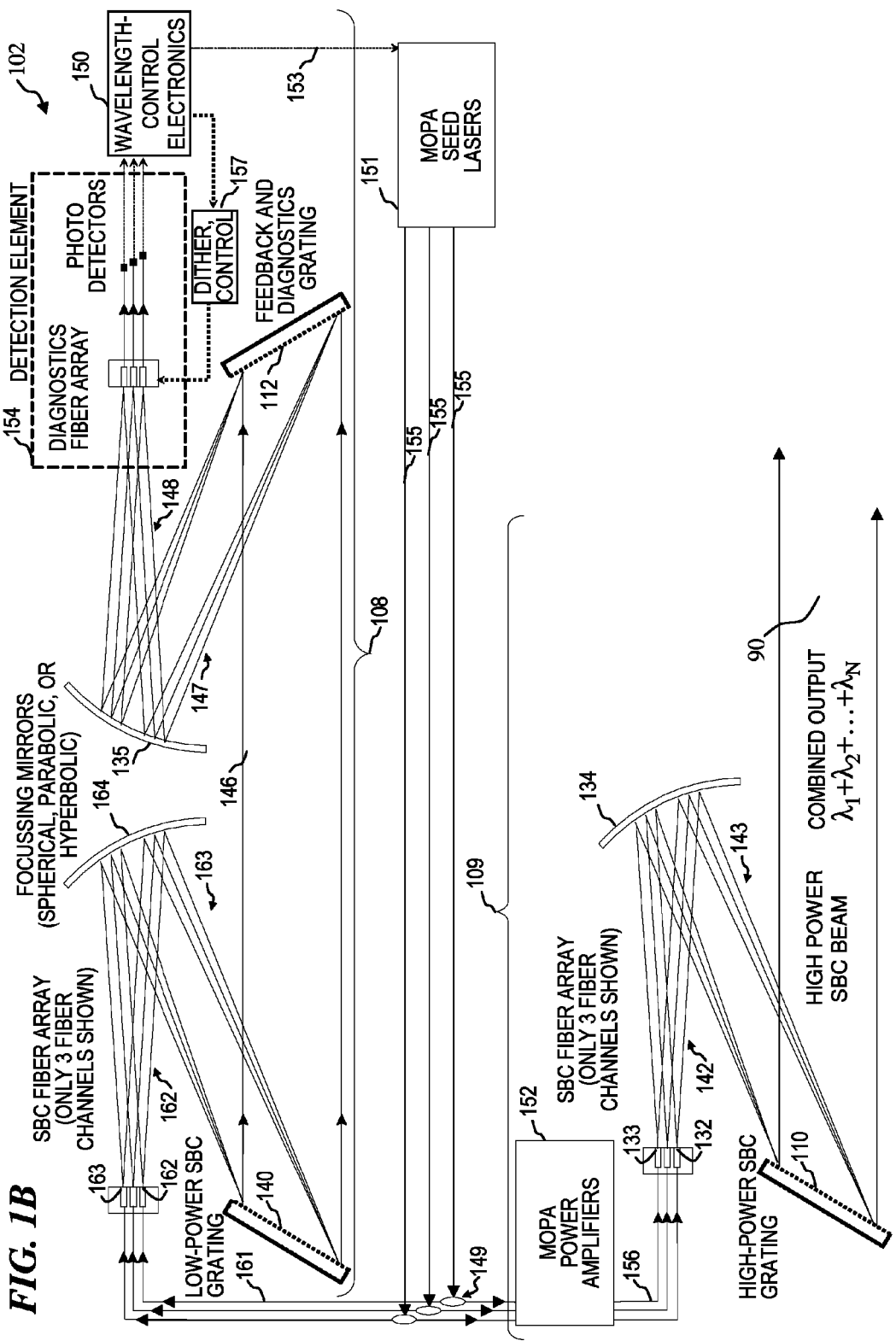
FIG. 1B is a diagram of a system 102 that spectrally beam combines an array of laser beams and performs beam diagnostics and control, according to some embodiments of the present invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

FIG. 1A1 is a block diagram of a system 101 that spectrally beam combines an array of laser beams and performs beam diagnostics and control, according to some embodiments of the present invention. In some embodiments, a plurality of seed lasers 151, each one of which provides one of the master-oscillator seed signals 155 under the control of wavelength-control electronics 150 (which receives electrical signals from photodetectors 139 indicating the power level in each of a plurality of laser beams 138). Each one of the seed signals 155 is coupled to a respective one of a plurality of power amplifiers 152 (e.g., in some embodiments, each power amplifier includes one or more gain-fiber preamplifier and/or amplifier stages using optical gain fibers such as described in U.S. Pat. No. 7,199,924 titled "APPARATUS AND METHOD FOR SPECTRAL-BEAM COMBINING OF HIGH-POWER FIBER LASERS," or using photonic-crystal gain fibers or rods such as described in U.S. Pat. No. 7,386,211 titled "METHOD AND APPARATUS FOR SPECTRAL-BEAM COMBINING OF MEGAWATT-PEAK-POWER BEAMS FROM PHOTONIC-CRYSTAL RODS," each of which is incorporated herein by reference). The amplified optical output beams 156 each have a wavelength (also called a channel) that is different from the wavelengths of the others of the output beams 156, and each output beam is emitted from a respective one of a plurality of fiber terminators 132-133 arranged in a row. In some embodiments, each of the fiber terminators 132-133 includes an endcap having a focussing element (such as a lens, or short piece of graded-index (GRIN) fiber, or curved mirror) to emit a respective diverging beam 142 (that is configured to provide a controlled-beam-divergence shape that is matched to be collimated by mirror 134) that is then focussed into a respective collimated beam 143 by mirror 134. Each collimated beam 143 is oriented at a different angle relative to one another, and are positioned such that the distal end of each collimated beam 143 impinges on the same area of diffractive grating 110, but each at a different angle that is determined such that each different wavelength will diffract into a single output beam 144 that is the spectral-beam combination of all the wavelengths of amplified beams 156. Together, this group is labeled as overall output optics 130 in FIG. 1A1. In some embodiments, most of beam 144 will reflect from high-reflection low-transmission (HRLT) mirror 111. In some embodiments, the first surface (left-hand surface in FIG. 1A1) has a plurality of dielectric layers having thicknesses that are highly reflective for the wavelengths of beam 144 when the mirror is at a selected angle (e.g., about forty-five degrees in the embodiment shown, but other embodiments can use other angles; for example, in some embodiments, the angle of mirror 111 is adjusted such that less than the maximum-possible proportion of light is reflected, in order to obtain a desired (sufficiently large) amount of transmitted light for the diagnostics in the upper right-hand portion of FIG. 1A1). In some embodiments, the second surface (right-hand surface in FIG. 1A1) of mirror 111 has a plurality of dielectric layers having thicknesses that are highly transmissive (antireflective) for the wavelengths of beam 144 when the mirror is at the selected angle for reflection of output beam 90); for example, in some embodiments, once the angle of mirror 111 is adjusted (or designed) such that less than the maximum proportion of light is reflected from the first surface, the thicknesses of the plurality of dielectric layers on the second surface are designed to be antireflective at the selected angle of mirror 111 for the wavelengths used in output beam 144. For example, in some embodiments, the mirror 111 will reflect 99.9% of combined beam 144 as output beam 90, and will transmit 0.1% as combined diagnostics beam 146, which impinges on feedback and/or diagnostics grating 112, which separates the plurality of wavelengths each into its own collimated beam of the plurality of beams 147 (each collimated beam 147 having a different angle of diffraction when diffracted by grating 112 due to its unique wavelength), which then are each reflected and focussed to a different separate spot on one of the fiber endcaps 136-137 of the receiving diagnostics fiber array, wherein each wavelength emitted from SBC fiber array of endcaps 132-133 is received by a corresponding one of the endcaps 136-137. Together, this group is labeled as overall feedback optics 131 in FIG. 1A1. In some embodiments, each endcap 136-137 receives one of the wavelengths and guides the respective signals 138 each to a different respective one of photodetectors 139, each of which generates an electrical signal 158 that is coupled to wavelength-control electronics 150. In some embodiments, if a given one of the electrical signals 158 is weak relative to the other beams (indicating a less than optimal amount of optical power in the corresponding diagnostic optical beam 138), the corresponding respective one of the seed lasers 151 is adjusted to correct its wavelength, e.g., in some embodiments, the wavelengths of the seed lasers 151 are subject to drift, so its wavelength is adjusted in order to compensate for that drift, and thus re-center the wavelength and thus the output beam of that wavelength within the output beam 90. In other embodiments, other adjustments can also be made by control electronics 150 (such as adjusting the pump lasers such that each seed beam 155 or amplified beam 156 has the proper amount of power). In some embodiments, control electronics 150 controls dither controller and actuator 157, which is operable to move the entire row of receiving endcaps 136-137 (e.g., in the up-down direction relative to FIG. 1A1) and simultaneously monitor the power levels of each diagnostic beam 138. In some embodiments, a dither-control table 159 is used to store positions corresponding to signal maximums and other characteristics for each channel. In this way, one of the endcaps 136-137 may move to a position that maximizes the power of its corresponding beam 138 to a level higher than the others of the beams 138, and that laser beam can be designated as the reference channel and thus the wavelengths of all of the other beams can be adjusted to increase each of their power levels and thus maximize the total power of output beam 90. In other embodiments, a predetermined one of the channels is designated as the reference channel, the dither controller and actuator 157 is controlled to move the entire row of receiving endcaps 136-137 up and down to find a physical location point for the receiving endcaps 136-137 at which the power of that reference channel is maximized. Once the reference channel is selected and maximized this establishes the reference position for the row of endcaps 136-137. The dithering control is then used to adjust the wavelength of each of the other plurality of channels. For example, if the dithering control moves the row of endcaps 136-137 in an upward direction relative to the reference position for the reference channel, and the result is that the $N^{th}$ channel's power increases, then the wavelength of the $N^{th}$ channel has been determined to be wrong for the reference position, and therefore system 101 adjusts the wavelength while dithering the position of the array of until the power for the $N^{th}$ channel is maximized for the reference position. In some embodiments, the system's dithering control (controller 150 and dither controller and actuator 157) moves the row of endcaps 136-137 in an upward and downward motion relative to the reference position, and system 101 adjusts the wavelength of a plurality of the channels (e.g., in some embodiments, all channels) while dithering the position of the array of until the power for each of a plurality of the channels channel is maximized for the reference position.

As used in FIG. 1A1, each "channel" includes its own seed laser 151 coupled to its power amplifier 152 to generate its amplified optical signal at that channel's wavelength that is combined by collimating mirror 134 and output grating 110 into combined high-power SBC beam 144 and partially reflected by mirror 111 into the output beam 90 and partially transmitted by mirror 111 into the leaked beam 146 that is separated by diagnostics grating 112 and focussing mirror 135 to one of the endcaps (136-137) and its fiber of the fiber array in detection element 154, which carries that channel's diagnostic optical signal to its respective detector 139 to generate that channel's diagnostic electrical signal 158 that is coupled to the control electronics 150, which in turn completes the feedback loop by controlling that channel's seed laser 151. In some embodiments, each channel's optical beam is pulsed, and control electronics 150 not only controls the wavelength of each channel, but also controls the timing and/or power level of each channel's optical seed pulses 155.

In some embodiments, two or more of the channels are pulsed (e.g., in some embodiments, all the channels) and the pulses are synchronized with one another to be simultaneous, in order to increase the power and energy of the output pulse of output beam 90. In other embodiments, two or more of the channels are pulsed (e.g., in some embodiments, all the channels) and the pulses are synchronized with one another with different delays to be sequential and adjacent in time, in order to increase the duration of the output pulse of output beam 90. In some such embodiments, the duration of each of the pulses is kept sufficiently short (i.e., shorter than 10 nanoseconds (ns); e.g., in some embodiments, pulses are about 5 ns) to prevent stimulated-Brillion-scattering (SBS) problems, and timed by control electronics and SBC combined such that the output beam 90 has a pulse duration of much longer than 10 ns. For example, in some embodiments, twenty sequential pulses, each 5 ns in duration, of twenty channels are combined into a single output pulse that is at least quasi continuous wave (CW) and has a duration of 100 ns. In some such embodiments, if the duty cycle of each channel is five percent (e.g., 5-ns-duration pulses with 95 ns between pulses), the output beam can be CW at a power level that is much higher than possible if the pulses were longer and SBS problems arose as a result. In some embodiments, each pulse is shaped to have an associated rise time and fall time, and the pulses and rise and fall times are adjusted such that the output beam has a more constant amplitude for its duration (i.e., the combined duration of the sequential pulses that make up the combined pulse (e.g., twenty pulses times five ns/pulse=100 ns, in the example just given).

In some embodiments of system 101, the maximum-power wavelength for a particular one (or more) of the channels as measured in the leaked portion 146 of the output beam 144 will be slightly different than the maximum power for that particular channel when most of the other channels are at their respective maximum-power wavelengths for the reference position of the row of endcaps 136-137, due to slight differences in the relative positions of the various endcaps in the row of endcaps 136-137 relative to the relative positions of the corresponding endcaps in the row of endcaps 132-133. Because system 101 adjusts the particular wavelength of each seed laser 151 individually, however, the reference position for the reference channel need not be the reference position used to adjust the wavelengths to maximize the output power of each of the other channels. In some embodiments, the reference positions (the locations to which the dither controller and actuator 157 moves the row of endcaps 136-137 for each respective channel's diagnostics and adjustment) can each be determined (e.g., in some embodiments, by empirical measurements one channel at a time of their contribution to the output beam) and in some embodiments, these dither-default positions for each of a plurality of channels are stored in a look-up table 159, and used as the starting (or "default") positions around which the dithering and wavelength-control operations are performed.

In some embodiments, a plurality of the seed lasers 151 (as shown in any of the Figures herein) are implemented as ring lasers such as described in U.S. Pat. No. 7,876,803 titled "HIGH-POWER, PULSED RING FIBER OSCILLATOR AND METHOD," issued Jan. 25, 2011 to Di Teodoro et al., U.S. Provisional Patent Application No. 61/263,736 titled "Q-SWITCHED OSCILLATOR SEED-SOURCE FOR MOPA LASER ILLUMINATOR METHOD AND APPARATUS" filed Nov. 23, 2009, by Matthias Savage-Leuchs et al., and U.S. patent application Ser. No. 12/952,190 titled "Q-SWITCHED OSCILLATOR SEED-SOURCE FOR MOPA LASER ILLUMINATOR METHOD AND APPARATUS" filed Nov. 22, 2010, by Matthias Savage-Leuchs et al., each of which is incorporated herein by reference.

FIG. 1A2 is a block diagram of a system 101' that spectrally beam combines an array of laser beams and performs beam diagnostics and control, according to some embodiments of the present invention. System 101' of FIG. 1A2 is somewhat similar to system 101 of FIG. 1A1, wherein elements with the same reference number in the two Figures have substantially identical functions and configuration. In some embodiments, system 101' of FIG. 1A2 differs from system 101 of FIG. 1A1 in at least two respects: first, SBC input grating 114 provides a compensating amount of chromatic dispersion in a direction opposite the direction of the output grating 110, and second, a second feedback and diagnostics grating 115 provides a compensating amount of chromatic dispersion in a direction opposite the direction of the first feedback and diagnostics grating 112. Note that in FIG. 1A1, a single output grating (reference 110) is used. This introduces a small amount of chromatic dispersion into each of the output wavelengths (i.e., no matter how narrow the linewidth of each laser beam, its wavelengths will be diffracted by the single output grating 110). Accordingly, some embodiments of the present invention (such as system 101' of FIG. 1A2) use a second grating to compensate by introducing a compensating dispersion in the opposite direction, in a manner similar to that described in U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS", and/or U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS", which are each incorporated herein by reference.

The amplified optical output beams 156 from power amplifiers 152 each have a wavelength (also called a channel) that is different from the wavelengths of the others of the output beams 156, and each output beam is emitted from a respective one of a plurality of fiber terminators 132-133 arranged in a row. In some embodiments, each of the fiber terminators 132-133 includes an endcap having a focussing element (such as a lens, or short piece of graded-index (GRIN) fiber, or curved mirror) to emit a respective diverging beam 142' (that is configured to provide a controlled-beam-divergence shape that is matched to the shape of collimating mirror 134', in order to be collimated by mirror 134'), that is then focussed into a respective collimated beam 142' by mirror 134'. In some embodiments, each collimated beam 142' is parallel to the others. Each collimated beam 142' is refracted by input grating 114 at a different angle relative to one another such that the group of diffracted collimated beams 143' converge. At the distal end, each beam 143' impinges on diffractive grating 110 at the same area on diffractive grating 110, but at a different angle that is determined such that each different wavelength will diffract into a single output beam 144 that is the spectral-beam combination of all the wavelengths of amplified beams 156. Together, this group of optics is labeled as overall output optics 130' in FIG. 1A2.

One function of SBC input grating 114 is to impart a compensating chromatic dispersion that is of substantially the same amount but in the opposite direction as the dispersion imparted by output SBC grating 110, as described in U.S. Pat. No. 7,199,924, which issued Apr. 3, 2007 to Andrew J. W. Brown et al., titled "APPARATUS AND METHOD FOR SPECTRAL-BEAM COMBINING OF HIGH-POWER FIBER LASERS" and/or U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS", each of which is incorporated herein by reference. In some embodiments, other dispersion-compensation configurations described in U.S. Pat. No. 7,199,924 and/or U.S. patent application Ser. No. 12/165,651 are substituted for overall output optics 130 in FIG. 1A1 or overall output optics 130' in FIG. 1A2, as well as for the respective mirror-image configurations of overall feedback optics 131 in FIG. 1A1 or overall feedback optics 131' in FIG. 1A2.

In some embodiments, most of beam 144 will reflect from high-reflection low-transmission (HRLT) mirror 111. In some embodiments, the first surface (left-hand surface in FIG. 1A2) has a plurality of dielectric layers having thicknesses that are highly reflective for the wavelengths of beam 144 when the mirror is at a selected angle (e.g., about forty-five degrees in the embodiment shown, but other embodiments can use other angles; for example, in some embodiments, the angle of mirror 111 is adjusted such that less than the maximum-possible proportion of light is reflected, in order to obtain a desired (sufficiently large) amount of transmitted light for the diagnostics in the upper right-hand portion of FIG. 1A2). In some embodiments, the second surface (right-hand surface in FIG. 1A2) of mirror 111 has a plurality of dielectric layers having thicknesses that are highly transmissive (antireflective) for the wavelengths of beam 144 when the mirror is at the selected angle for reflection of output beam 90'); for example, in some embodiments, once the angle of mirror 111 is adjusted (or designed) such that less than the maximum proportion of light is reflected from the first surface, the thicknesses of the plurality of dielectric layers on the second surface are designed to be antireflective at the selected angle of mirror 111 for the wavelengths used in output beam 144. For example, in some embodiments, the mirror 111 will reflect 99.9% (or such other proportion as may be desired for the detectors 139 to obtain a suitable amount of light to detect for analysis and feedback control) of combined beam 144 as output beam 90', and will transmit 0.1% as combined diagnostics beam 146', which impinges on first feedback and/or diagnostics grating 112, which separates the plurality of wavelengths each into its own respective collimated beam of the plurality of beams 147' (each respective collimated beam 147' having a different angle of diffraction when diffracted by first feedback-and-diagnostics grating 112 due to its unique wavelength spectrum), which then are separated by the second feedback-and-diagnostics grating 115 into parallel collimated beams 148'. Each respective collimated beam 148' is then focussed by focussing mirror 135' to a different separate spot on one of the fiber endcaps 136'-137' of the receiving diagnostics fiber array, wherein each wavelength emitted from SBC fiber array of endcaps 132-133 is received by a corresponding one of the endcaps 136'-137'. Together, this group of feedback optics is labeled as overall feedback optics 131' in FIG. 1A2. In some embodiments, each endcap 136'-137' receives one of the wavelengths and guides the respective signals 138 each to a different respective photodetectors 139, each of which generates an electrical signal 158 that is coupled to wavelength-control electronics 150. In some embodiments, if a given one of the electrical signals 158 is weak relative to the other beams (indicating a less than optimal amount of optical power in the corresponding diagnostic optical beam 138), the corresponding respective one of the seed lasers 151 is adjusted to correct its wavelength, e.g., in some embodiments, the wavelengths of the seed lasers 151 are subject to drift, so its wavelength is adjusted in order to compensate for that drift, and thus re-center the wavelength and thus the output beam of that wavelength within the output beam 90'. In other embodiments, other adjustments can also be made by control electronics 150 (such as adjusting the pump lasers such that each seed beam 155 or amplified beam 156 has the proper amount of power). In some embodiments, control electronics 150 controls dither controller and actuator 157', which is operable to move the entire row of receiving endcaps 136'-137' (e.g., in the up-and-right to down-and-left direction relative to FIG. 1A2) and simultaneously monitor the power levels of each diagnostic beam 138. In this way, one of the endcaps 136'-137' may move to a position that maximizes the power of its corresponding beam 138 to a level higher than the others of the beams 138, and that laser beam can be designated as the reference channel and thus the wavelengths of all of the other beams can be individually adjusted relative to the reference beam to increase each of their power levels and thus maximize the total power of output beam 90'.

In other embodiments, a predetermined one of the channels is designated as the reference channel, the dither controller and actuator 157' is controlled to move the entire row of receiving endcaps 136'-137' up and down to find a physical location point for the receiving endcaps 136'-137' at which the power of that reference channel is maximized. Once the reference channel is selected and maximized this establishes the reference position for the row of endcaps 136'-137'. The dithering control is then used to adjust the wavelength of each of the other plurality of channels. For example, if the dithering control moves the row of endcaps 136'-137' in an upward direction relative to the reference position for the reference channel, and the result is that the $N^{th}$ channel's power increases, then the wavelength of the $N^{th}$ channel has been determined to be wrong for the reference position, and therefore system 101' adjusts the wavelength while dithering the position of the array of until the power for the $N^{th}$ channel is maximized for the reference position. In some embodiments, the system's dithering control (controller 150 and dither controller and actuator 157') moves the row of endcaps 136'-137' in an up-and-rightward and down-and-leftward motion relative to the reference position, and system 101' adjusts the wavelength of a plurality of the channels (e.g., in some embodiments, all channels) while dithering the position of the array of until the power for each of a plurality of the channels channel is maximized for the reference position.

As used in FIG. 1A2, each "channel" includes its own seed laser 151 coupled to its power amplifier 152 to generate its amplified optical signal at that channel's wavelength that is combined by collimating mirror 134', SBC input grating 114, and output grating 110 into combined high-power SBC beam 144 and partially reflected by mirror 111 into the output beam 90' and partially transmitted by mirror 111 into the leaked beam 146' that is separated by first diagnostics grating 112, second diagnostics grating 115 (which imparts a compensating dispersion corresponding to the dispersion of input grating 114), and focussing mirror 135 to one of the endcaps (136'-137') and its fiber of the fiber array in detection element 154, which carries that channel's diagnostic optical signal to its respective detector 139 to generate that channel's diagnostic electrical signal 158 that is coupled to the control electronics 150, which in turn completes the feedback loop by controlling that channel's seed laser 151. In some embodiments, each channel's optical beam is pulsed, and control electronics 150 not only controls the wavelength of each channel, but also controls the timing and/or power level of each channel's optical seed pulses 155.

In some embodiments, two or more of the channels are pulsed (e.g., in some embodiments, all the channels) and the pulses are synchronized with one another to be simultaneous, in order to increase the power and energy of the output pulse of output beam 90'. In other embodiments, two or more of the channels are pulsed (e.g., in some embodiments, all the channels) and the pulses are synchronized with one another with different delays to be sequential and adjacent in time, in order to increase the duration of the output pulse of output beam 90'. In some such embodiments, the duration of each of the pulses is kept sufficiently short (i.e., shorter than 10 nanoseconds (ns); e.g., in some embodiments, pulses are about 5 ns) to prevent stimulated-Brillin-scattering (SBS) problems, and timed by control electronics and SBC combined such that the output beam 90' has a pulse duration of much longer than 10 ns. For example, in some embodiments, twenty sequential pulses, each 5 ns in duration, of twenty channels are combined into a single output pulse that is at least quasi continuous wave (CW) and has a duration of 100 ns. In some such embodiments, if the duty cycle of each channel is five percent (e.g., 5-ns-duration pulses with 95 ns between pulses), the output beam can be CW (or substantially CW) at a power level that is much higher than possible if the pulses were longer and SBS problems arose as a result. In some embodiments, each pulse is shaped to have an associated rise time and fall time, and the pulses and rise and fall times are adjusted such that the output beam has a more constant amplitude for its duration (i.e., the combined duration of the sequential pulses that make up the combined pulse (e.g., twenty pulses times five ns/pulse=100 ns, in the example just given).

In some embodiments of system 101', the maximum-power wavelength for a particular one (or more) of the channels as measured in the leaked portion 146' of the output beam 144 will be slightly different than the maximum power for that particular channel when most of the other channels are at their respective maximum-power wavelengths for the reference position of the row of endcaps 136'-137', due to slight differences in the relative positions of the various endcaps in the row of endcaps 136'-137' relative to the relative positions of the corresponding endcaps in the row of endcaps 132-133. Because system 101' adjusts the particular wavelength of each seed laser 151 individually, however, the reference position for the reference channel need not be the reference position used to adjust the wavelengths to maximize the output power of each of the other channels. In some embodiments, the reference positions (the locations to which the dither controller and actuator 157' moves the row of endcaps 136'-137' for each respective channel's diagnostics and adjustment) can each be determined (e.g., in some embodiments, by empirical measurements one channel at a time of their contribution to the output beam) and in some embodiments, these dither-default positions for each of a plurality of channels are stored in a look-up table 159, and used as the starting (or "default") positions around which the dithering and wavelength-control operations are performed.

FIG. 1B is a diagram of a system 102 that spectrally beam combines an array of laser beams and performs beam diagnostics and control, according to some embodiments of the present invention. System 102 of FIG. 1B is somewhat similar to system 101 of FIG. 1A1, where elements with the same reference number in the two Figures have identical functions and configuration. In some embodiments, the configuration of system 102 allows the diagnostics portion 108 in the upper part of FIG. 1B to be placed in a location remote from the high-power portion 109 of the lower part of FIG. 1B, which may be located at, for example, the nose of an aircraft, where space can be at a premium and heat interactions can be a problem (e.g., heat from the power amplifiers can possibly interfere with the wavelength diagnostics and control of the upper part of FIG. 1B if they are located close to one another). The high-power portion 109 of FIG. 1B omits the partially reflective mirror 111, but is otherwise identical to the corresponding part of FIG. 1A1. The optical signals 155 from the MOPA seed lasers 151 are split by optical splitters 149, such that one portion of each signal 155 is coupled to its corresponding power amplifier 152 as was the case in FIG. 1A1, but another portion 161 of each signal is connected to a corresponding low-power endcap 162-163 of an SBC fiber array (in the same manner as SBC fiber array 132-133 in the high-power portion 109), such that low power optical signals 161 are emitted as spreading beams 162, which are focussed into collimated beams 163 (each at a different angle) by collimating mirror 164 and then spectral-beam combined into a single collimated SBC beam 146 using low-power SBC grating 140. The remaining portion (grating 112, mirror 135, detection element 154, control electronics 150, dither controller and actuator 157, and seed lasers 151 are the same as the corresponding parts shown in FIG. 1A1. In some embodiments, the SBC elements (162-163, 164, and 140) and the SBC beam 146 of low-power portion 108 are scaled (e.g., to a smaller size) as compared to the corresponding SBC elements (132-133, 134, and 110) and the SBC output beam 90 of high-power portion 109 (e.g., in order to save space), but the control of the wavelengths, pulse timing, and power are performed in a similar manner as described for FIG. 1A1, and this scaled diagnostics provides an equivalent control of the output beam 90 that is similar to the control applied in FIG. 1A1.

Figure 1C:
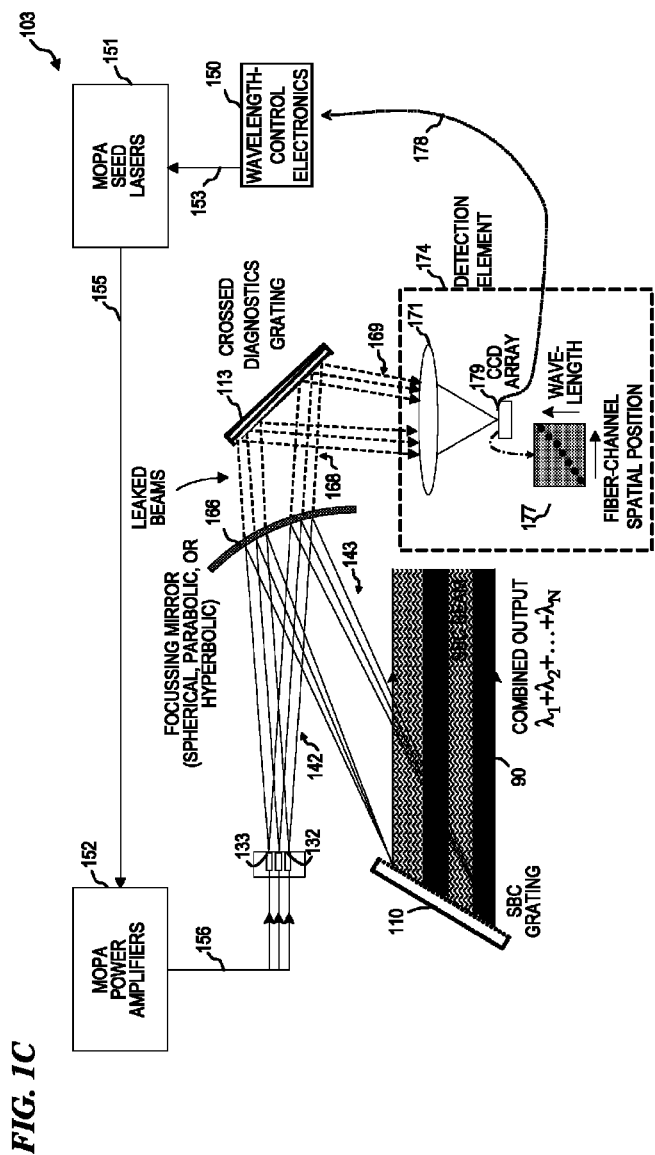
FIG. 1C is a diagram of a system 103 that spectrally beam combines an array of laser beams and performs beam diagnostics and control, according to some embodiments of the present invention.

FIG. 1C is a diagram of a system 103 that spectrally beam combines an array of laser beams and performs beam diagnostics and control, according to some embodiments of the present invention. System 103 of FIG. 1C is somewhat similar to system 101 of FIG. 1A1, wherein elements with the same reference number in the two Figures have substantially identical functions and configuration. In this figure, each "channel" includes its own seed laser 151 coupled to its respective power amplifier 152 to generate its amplified optical signal 156 at that channel's wavelength that is emitted as one of the beams 142 from one of the fiber endcaps of SBC fiber array 132-133, collimated by partially reflective (e.g., in some embodiments, about 99.9% reflective) collimating mirror 166 and SBC combined by output grating 110 into combined high-power SBC output beam 90. The diverging beams are partially transmitted by mirror 166 into the leaked beams 168 that are diffracted by diagnostics grating 113 (which are diffracted as beams 169 in a direction that is substantially perpendicular to the drawing sheet) towards detection element 174 and focussed by focussing element 171 (e.g., a lens as shown, or in other embodiments, a mirror (not shown)) to form a two-dimensional (2D) image 177 on imaging device 179 (e.g., in some embodiments, imaging device 179 includes a charge-coupled device (CCD) array of pixels), wherein the image of each channel is spaced along one dimension of 2D image 177 (e.g., the horizontal direction spacing of the diagonal row of spots on 2D image 177 in FIG. 1C) indicating that channel's spatial position, and spaced along the other dimension of 2D image 177 (e.g., the vertical direction spacing of the diagonal row of spots on 2D image 177 in FIG. 1C) indicating that channel's wavelength. The image signal 178 generated by image device 179 is coupled to the control electronics 150, which in turn analyzes the image data and generates feedback signals 153 for each signal wavelength to complete the feedback loop by controlling that channel's seed laser 151. If the signal wavelength of one or more of the channels drifts, the vertical position of the spot on the imaging device 179 will change. Note that in some embodiments, the grooves of grating 110 are perpendicular to the drawing sheet, while the grooves of grating 113 are not perpendicular to the drawing sheet (in some embodiments, the grooves of grating 113 are parallel to the drawing sheet), in order that a wavelength shift of one of the channels moves the position of its spot in a direction perpendicular to the drawing sheet of FIG. 1C, while the left-right position of each spot is determined by the location of its emitter on endcap array 132-133. In some embodiments, each channel's optical beam is pulsed, and control electronics 150 not only controls the wavelength of each channel, but also controls the timing and/or power level of each channel's optical seed pulses 155. Other aspects of system 103 are the same or substantially similar to system 101 of FIG. 1A1.

Figure 1D:
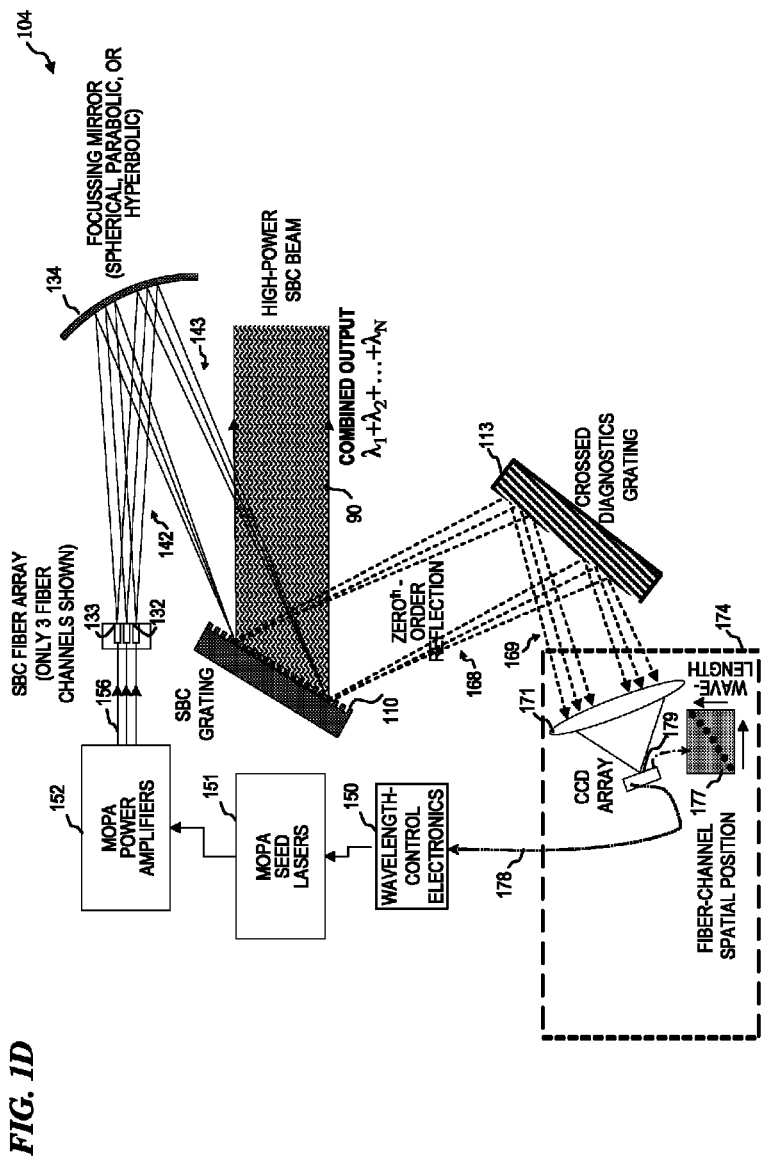
FIG. 1D is a diagram of a system 104 that spectrally beam combines an array of laser beams and performs beam diagnostics and control, according to some embodiments of the present invention.

FIG. 1D is a diagram of a system 104 that spectrally beam combines an array of laser beams and performs beam diagnostics and control, according to some embodiments of the present invention. System 104 of FIG. 1D is somewhat conceptually similar to system 103 of FIG. 1C, wherein elements with the same reference number in the two Figures have substantially identical functions and configuration. Rather than obtaining the diagnostics beams from the light transmitted by partially reflective collimating mirror 166 (used in system 103 of FIG. 1C), a highly reflective mirror 134 is used in system 104 of FIG. 1D, and the diagnostics beams 168 are obtained by using the zeroth-order beams (essentially beams that are reflected (wherein the angle of incidence (relative to the normal vector of the overall plane of the grating surface) equals the angle of reflection) by grating 110 (which, in some embodiments, has grooved substantially perpendicular to the drawing sheet) (or, in other embodiments, other diffraction-order diffracted beams rather than the zeroth-order reflected beams)), which are then diffracted as beams 169 in a direction that is substantially perpendicular to the drawing sheet by the "crossed" diagnostics grating 113 (which, in some embodiments, has grating grooves that are substantially parallel to the drawing sheet). In this figure (in a manner similar to the case for FIG. 1C), each "channel" includes its own seed laser 151 coupled to its respective power amplifier 152 to generate its amplified optical signal 156 at that channel's wavelength that is emitted as one of the beams 142 from one of the fiber endcaps of SBC fiber array 132-133, collimated by highly reflective collimating mirror 134 and SBC combined by output grating 110 into combined high-power SBC output beam 90. The diverging beams are partially reflected (the zeroth-order beams) by grating 110 into the diagnostics beams 168 that are diffracted by diagnostics grating 113 (in a direction perpendicular to the drawing sheet) and focussed by focussing element 171 (e.g., a lens as shown, or in other embodiments, a mirror (not shown)) to form a two-dimensional (2D) image 177 on imaging device 179. Other aspects of system 104 are the same or substantially similar to system 103 of FIG. 1C.

Note that in FIG. 1A1, FIG. 1B, FIG. 1C, FIG. 1D, and FIG. 2A1, a single output grating (reference 110) is used. This introduces a small amount of chromatic dispersion into each of the output wavelengths (i.e., no matter how narrow the linewidth of each laser beam, its wavelengths will be diffracted by the single output grating 110). Accordingly, some embodiments of the present invention (such as system 101' of FIG. 1A2, system 105 of FIG. 1E1, and 201' of FIG. 2A2) use another one or more gratings (to compensate by introducing a compensating dispersion in the opposite direction, in a manner similar to that described in U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS", and/or U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS", which are each incorporated herein by reference.

FIG. 1E1 is a diagram of a system 105 that spectrally beam combines an array of laser beams and performs beam diagnostics and control, according to some embodiments of the present invention. System 105 of FIG. 1E1 is somewhat similar to system 103 of FIG. 1C, wherein elements with the same reference number in the two Figures have substantially identical functions and configuration. In some embodiments, system 105 of FIG. 1E1 differs in at least two respects: first, a second diffraction grating 117 provides a compensating amount of chromatic dispersion in a direction opposite the direction of the final output grating 118, and second, the output grating 118 is partially reflective (e.g., diffracting most of the laser beams 187 into the output beam 90, while transmitting a small portion of all the beams as diagnostic beams 188, which are then focussed by focussing element 181 into different locations on sensor 180. In this FIG. 1E1, each "channel" includes its own seed laser 151 coupled to its respective power amplifier 152 to generate its amplified optical signal 156 at that channel's wavelength that is propagated as one of the collimated beams 186 from one of the fiber endcaps and collimating optics of SBC fiber array 182-183, pre-compensated by grating 117 into pre-compensated collimated beams 187 that are at different angles, and SBC combined by output grating 118 into combined high-power SBC output beam 90. The diverging beams are partially transmitted by grating 118 into the leaked beams 188 that are focussed by focussing element 181 (e.g., a lens as shown, or in other embodiments, a mirror (not shown)) onto sensors 180 (in some embodiments, these beams are diffracted by a diagnostics grating 113 (not shown here, but similar to grating 113 of FIG. 1C with grooves in a direction parallel to the drawing sheet, to form a two-dimensional (2D) image on sensor 180 (e.g., in some embodiments, sensor 180 includes a charge-coupled device (CCD) array of pixels), wherein the image of each channel is spaced along one dimension of the 2D image. The image signal generated by sensor 180 carries each channel's diagnostic electrical signal to the control electronics 150, which in turn completes the feedback loop by controlling that channel's seed laser 151. If the wavelength of one or more of the channels drifts, the position of the spot on the sensor 180 will change (due to a changed diffraction angle from the first grating 117). Other aspects of system 105 are the same or substantially similar to system 103 of FIG. 1C.

FIG. 1E2 is a diagram of a system 105' that spectrally beam combines an array of laser beams and performs beam diagnostics and control, according to some embodiments of the present invention. System 105' of FIG. 1E2 is similar to system 105 of FIG. 1E1, wherein elements with the same reference number in the two Figures have substantially identical functions and configuration. In some embodiments, system 105' of FIG. 1E2 differs in at least two respects: first, the output grating 118 is reflective rather than partially reflective (e.g., diffracting most of the laser beams 187 into the output beam 90), and second, the diagnostics beams 188' are obtained by using the zeroth-order beams reflected by grating 118' (which, in some embodiments, has grooved substantially perpendicular to the drawing sheet) (or, in other embodiments, other diffraction-order diffracted beams rather than the zeroth-order reflected beams). The diverging diagnostics beams 188' are the zeroth-order reflected (or some other diffracted order) beams by grating 118' into the "leaked" beams 188' (they are "leaked" in the sense that they include light not diffracted into output beam 90) that are focussed by focussing element 181 (e.g., a lens as shown, or in other embodiments, a mirror (not shown)) onto sensors 180 (in some embodiments, these beams are diffracted by a diagnostics grating 113 (not shown here, but similar to grating 113 of FIG. 1C with grooves in a direction parallel to the drawing sheet, to form a two-dimensional (2D) image on sensor 180 (e.g., in some embodiments, sensor 180 includes a charge-coupled device (CCD) array of pixels), wherein the image of each channel is spaced along one dimension of the 2D image. The image signal generated by sensor 180 carries each channel's diagnostic electrical signal to the controller 160 portion of control electronics 150, which in turn completes the feedback loop by controlling that channel's seed laser 151. If the wavelength of one or more of the channels drifts, the position of the spot on the sensor 180 will change (due to a changed diffraction angle from the first grating 117). Other aspects of system 105' are the same or substantially similar to system 105 of FIG. 1E1.

FIG. 2A1 is a diagram of a power-oscillator ring-laser SBC system 201 that spectrally beam combines an array of ring-laser beams and performs beam diagnostics and control, according to some embodiments of the present invention. Rather than use the master-oscillator power-amplifier configurations of FIG. 1A1, FIG. 1A2, FIG. 1B, FIG. 1C, FIG. 1D, FIG. 1E1, or FIG. 1E2, system 201 of FIG. 2A1 uses a plurality of power-oscillator ring lasers. System 201 of FIG. 2A1 is somewhat similar to system 101 of FIG. 1A1, wherein elements with the same reference number in the two Figures have substantially identical functions and configuration. Rather than using seed lasers, each laser here is a ring laser that obtains its feedback signal from the portion of the output beam that is transmitted by partially reflecting output mirror 111, such that (depending on the optical gain of the ring lasers' gain media) the leaked beams 246 typically have a higher power level than the leaked beams 146 of FIG. 1A1 (e.g., partially reflecting output mirror 111 transmits enough signal power to maintain a lasing condition for each of the ring lasers). System 201 receives the separated individual channel beams into respective ones of endcaps 236-237 that are connected by optical fibers to respective ones of a plurality of optical splitters 235 to obtain the set of diagnostics beams 238 and the set of feedback beams 248. In some embodiments, the set of feedback beams 248 pass through optical isolator 253 (which, in some embodiments, is implemented by using a plurality of isolators (e.g., one for each beam), or in other embodiments, by using a single isolator for a plurality of beams (e.g., where a plurality of beams pass side-by-side from a plurality of fiber ends connected to splitters 235 into respective ones of a plurality of fibers coupled to optional modulator 251 or directly to the gain fibers 252, one for each channel's beam)). In some embodiments, optical isolator 253 enhances beam stability by forcing all the signal beams to propagate in a single direction (counterclockwise in FIG. 2A1). In some embodiments, the optional optical switch or modulator 251 is controlled by pulse-timing controller 254 (in some embodiments, controller 254 uses a programmable microprocessor to provide programmable and/or changeable control over pulse timing, while in other embodiments, high-speed electronics are used to implement higher speeds than may be possible using a microprocessor). In some embodiments, timing controller 254 and optical switch or modulator 251 are used to implement a Q-switched pulsed ring-laser mode that prevents the optical signal from passing during time periods between pulses (in some embodiments, pump power accumulates in gain fibers 252 during this time), and then allows the optical signal to pass during each pulse. In some embodiments, the amount of signal passed is varied (e.g., ramped up) in order to compensate for the amount of gain available in the gain fibers 252 (this gain is higher immediately after energy has been accumulated for the between-pulse times and then decreases as the Q-switched pulse extracts energy). In other embodiments, an optical switch or modulator 251' (not shown) instead replaces the output mirror 111 to provide a cavity-dumping mode, wherein the optical switch or modulator 251' passes substantially all of signal 144 through to signal path indicated by reference 246 during time periods between pulses (in some embodiments, signal power accumulates in gain fibers 252 during this time), and then allows the optical signal to pass out the signal path indicated by reference number 90 during each pulse.

In some embodiments, the splitters 235 each couple a diagnostic signal 238 (e.g., in some embodiments, each containing about one percent (or other suitable amount) of the feedback signals) to the plurality of photodetectors 239, which generate electrical signals 258 that are coupled to wavelength-control electronics 250. In some embodiments, wavelength-control electronics 250 control a plurality of actuators 255 (e.g., one per channel) that separately control the position of each one of the receiving endcaps 236-237 (e.g., by moving the endcap for the Nth channel in one direction, the wavelength may be increased while moving the endcap for the Nth channel in the opposite direction, the wavelength may be decreased). Thus the individual wavelengths are controlled to maintain each beam in proper alignment with all the other beams. Other aspects of system 201 of FIG. 2A1 are the same or substantially similar to those as described above for system 101 of FIG. 1A1.

FIG. 2A2 is a diagram of a system 201' that spectrally beam combines an array of laser beams and performs beam diagnostics and control, and compensates for chromatic dispersion, according to some embodiments of the present invention. System 201' of FIG. 2A2 is somewhat similar to system 201 of FIG. 2A1, wherein elements with the same reference number in the two Figures have substantially identical functions and configuration. Similar to system 201 of FIG. 2A1, each laser here is a ring laser that has a different signal wavelength than the others and that obtains its feedback signal from the portion of the output beam that is transmitted by partially reflecting output mirror 111, such that (depending on the optical gain of the gain media) the leaked beams 246' typically have a higher power level than the leaked beams 146' of FIG. 1A2 (e.g., partially reflecting output mirror 111 transmits enough signal power to maintain a lasing condition for each of the ring lasers).

In some embodiments, system 201' of FIG. 2A2 differs from system 201 of FIG. 2A1 in at least two respects: first, SBC input grating 114 provides a compensating amount of chromatic dispersion in a direction opposite the direction of the output grating 110, and second, a second feedback-and-diagnostics grating 115 provides a compensating amount of chromatic dispersion in a direction opposite the direction of the first feedback and diagnostics grating 112. Note that in FIG. 2A1, a single output grating (reference 110) is used. This introduces a small amount of chromatic dispersion into each of the output wavelengths (i.e., no matter how narrow the linewidth of each laser beam, its wavelengths will be diffracted by the single output grating 110). Accordingly, some embodiments of the present invention (such as system 201' of FIG. 2A2) use a second grating 114 to compensate by introducing a compensating dispersion in the opposite direction, in a manner similar to that described in U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS", and/or U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS", which are each incorporated herein by reference.

In some embodiments, system 201' receives the separated individual channel beams into respective ones of endcaps 236'-237' that are connected by optical fibers to respective ones of a plurality of optical splitters 235 to obtain the set of diagnostics beams 238 and the set of feedback beams 248. In some embodiments, the set of feedback beams 248 pass through optical isolator 253 (which, in some embodiments, is implemented by using a plurality of isolators (e.g., one for each beam), or in other embodiments, by using a single isolator for a plurality of beams (e.g., where a plurality of beams pass side-by-side from a plurality of fiber ends connected to splitters 235 into respective ones of a plurality of fibers coupled to optional modulator 251 or directly to the gain fibers 252, one for each channel's beam). In some embodiments, optical isolator 253 enhances beam stability by forcing all the signal beams to propagate in a single direction (counterclockwise in FIG. 2A2). In some embodiments, the optional optical switch or modulator 251 is controlled by pulse-timing controller 254 (in some embodiments, controller 254 uses a programmable microprocessor to provide programmable and/or changeable control over pulse timing, while in other embodiments, high-speed electronics are used to implement higher speeds than may be possible using a microprocessor). In some embodiments, timing controller 254 and optical switch or modulator 251 are used to implement a Q-switched pulsed ring-laser mode that prevents the optical signal from passing during time periods between pulses (in some embodiments, pump power accumulates in gain fibers 252 during this time), and then allows the optical signal to pass during each pulse. In some embodiments, the amount of signal passed is varied (e.g., ramped up) in order to compensate for the amount of gain available in the gain fibers 252 (this gain is higher immediately after energy has been accumulated for the between-pulse times and then decreases as the Q-switched pulse extracts energy). In other embodiments, an optical switch or modulator 251' (not shown) instead replaces the output mirror 111 to provide a cavity-dumping mode, wherein the optical switch or modulator 251' passes substantially all of signal 144 through to signal path indicated by reference 246' during time periods between pulses (in some embodiments, signal power accumulates in gain fibers 252 during this time), and then allows the optical signal to pass out the signal path indicated by reference number 90' during each pulse.

In some embodiments, the splitters 235 each couple a diagnostic signal 238 (e.g., in some embodiments, each containing about one percent (or other suitable amount) of the feedback signals) to the plurality of photodetectors 239, which generate electrical signals 258 that are coupled to wavelength-control electronics 250. In some embodiments, wavelength-control electronics 250 control a plurality of actuators 255 (e.g., one per channel) that separately control the position of each one of the receiving endcaps 236'-237' (e.g., by moving the endcap for the Nth channel in one direction, the wavelength may be increased while moving the endcap for the Nth channel in the opposite direction, the wavelength may be decreased). Thus the individual wavelengths are controlled to maintain each beam in proper alignment with all the other beams. Other aspects of system 201' of FIG. 2A2 are the same or substantially similar to those as described above for system 101' of FIG. 1A2.

Figure 3A:
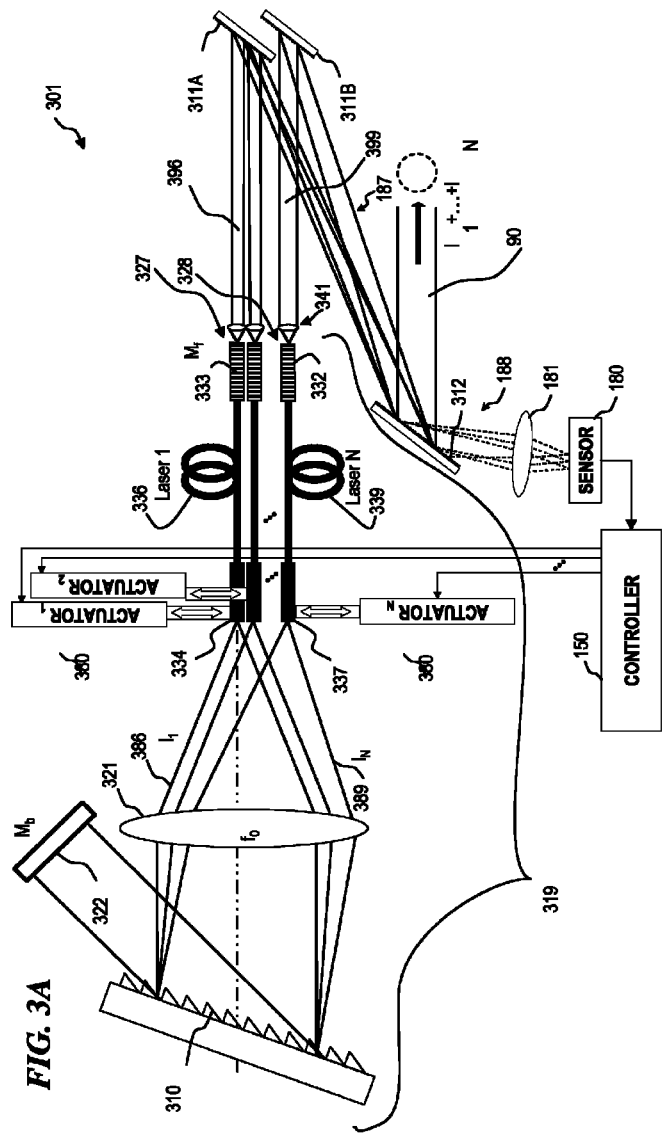
FIG. 3A is a diagram of a system 301 that spectrally beam combines an array of laser beams and performs beam diagnostics and control, according to some embodiments of the present invention.

FIG. 3A is a diagram of a system 301 that spectrally beam combines an array of laser beams and performs beam diagnostics and control, according to some embodiments of the present invention. In some embodiments, system 301 of FIG. 3A differs in at least two respects from system 105 of FIG. 1E1: first, a power-oscillator configuration (with the left end of each laser being mirror 322 and the right-hand end of each laser being reflectors 327-328 similar to that described in U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS", and/or U.S. patent application Ser. No. 12/165,651 filed Jun. 30, 2008 by Steven C. Tidwell et al., titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS", which are each incorporated herein by reference), and secondly, the zeroth-order reflection or other diffraction-order diffracted beams 312 from output grating 312 are used, which are then focussed by focussing element 181 into different locations on sensor 180. In this FIG. 3A, each "channel" includes its own gain fiber 336-339 (power oscillator configuration) to generate its amplified optical signal collimated into beams 396-399 at that channel's wavelength that is emitted as one of the collimated beams, one from each fiber endcap and collimating optics of SBC fiber partially reflecting endcap array 332-333 (the reflection signals cause the lasing, while the transmitted signals are collimated by focussing elements 341 into beams 396-399 that impinge on input grating 114), pre-compensated by input gratings 311A-311B (multiple gratings used such that the distance for each beam between the input gratings 311A-311B and the output grating 312 are about equal) into pre-compensated collimated beams 187 that are at different angles, and SBC combined by output grating 312 into combined high-power SBC output beam 90. The diverging beams are partially reflected (i.e., the zeroth-order beams) or diffracted (some other diffraction-order diffracted beams) by grating 312 into the "leaked" beams 188 that are focussed by focussing element 181 (e.g., a lens as shown, or in other embodiments, a mirror (not shown)) onto sensors 180 (in some embodiments, the "leaked" beams 188 are diffracted by a diagnostics grating 113 (not shown here, but similar to grating 113 of FIG. 1C with grooves in a direction parallel to the drawing sheet, to form a two-dimensional (2D) image on sensor 180 (e.g., in some embodiments, sensor 180 includes a charge-coupled device (CCD) array of pixels))), wherein the image of each channel is spaced along one dimension of the 2D image. The image signal generated by sensor 180 carries each channel's diagnostic electrical signal to the control electronics 150, which in turn completes the feedback loop by controlling that channel's actuator 380. If the wavelength of one or more of the channels drifts, the position of the spot on the sensor 180 will change (due to a changed diffraction angle from that beam's first grating 311A-311B). Other aspects of system 301 are the same or substantially similar to system 103 of FIG. 1C.

FIG. 3B is a diagram of a system 302 that spectrally beam combines an array of laser beams and performs beam diagnostics and control, according to some embodiments of the present invention. In some embodiments, system 302 includes one or more chromatic-dispersion compensating input gratings 114, an output grating 110, a mostly reflective output mirror 111 that reflects output beam 390 and transmits the leaked combined diagnostics beam 146', which impinges on feedback and/or diagnostics grating 112, which separates the plurality of wavelengths each into its own respective collimated beam of the plurality of beams 147' (each respective collimated beam 147' having a different angle of diffraction when diffracted by first feedback-and-diagnostics grating 112 due to its unique wavelength spectrum). However, unlike system 101' of FIG. 1A2, the second diagnostics diffraction grating (grating 115 of FIG. 1A1) is omitted, and the beams 147 are focussed by focussing element 181 (e.g., a lens as shown or, in other embodiments, a focussing mirror, hologram, or other focussing element) onto sensor 180, which generates feedback signals for controller 150, which controls actuators 380 to selectively control the stretch and/or rotation (either or both of which control the lines/mm spacing of the grating lines as seen by the light signal) of gratings 381 to control signal lasing wavelengths. Similar grating configurations are shown and described in FIG. 3I of U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS", which is incorporated herein by reference. In some embodiments, fibers 386-389 are coupled to power gain fibers 336-339, which terminate at partially reflecting end-caps 333-332 (the reflection signals cause the lasing, while the transmitted signals are collimated by focussing elements 341 into beams 396-399 that impinge on input grating 114). Other aspects of system 302 are as described above.

FIG. 4 is a schematic of a high-power system 400 that spectrally beam combines an array of laser beams and performs beam diagnostics and control, according to some embodiments of the present invention. In some embodiments, system 400 (e.g., a vehicle such as a land vehicle (such as a tank or remotely-operated robotic vehicle), airframe (such as a helicopter or jet airplane), vessel (such as a frigate, destroyer or aircraft carrier) or facility (such as an airport or bunker)) using one or more of the SBC-fiber-laser systems as described herein. In some embodiments, system 400 includes the vehicle, airframe, vessel or facility enclosure 409 and its other contents (e.g., engines and control systems), one or more battery and/or electrical power supplies 418, a laser controller 450 that provides the control of wavelength, pulse timing and duration for embodiments using pulse signals (other embodiments use CW signal beams), output-power control, direction control of the output beam and the like, an imaging calculation microprocessor and/or circuitry that obtains an image signal 461 from imager 416 and calculates such data as target location and velocity that is then delivered to laser controller 450, which includes signal processors that receive wavelength-determination signals and/or directional-drift feedback signals from the output signals from power amplifiers 420 (with their associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to master oscillator seed lasers 410. In some embodiments, laser controller 450 generates the control and power signals that are sent to power amplifiers 420, which then delivers high-power optical beams at suitable wavelengths to SBC 430, which then combines the laser beams into a single output laser SBC beam 99 that is directed toward a target (e.g., a hostile aircraft, missile or spacecraft) as output beam 441, according to the control information that was generated based on image information obtained from imager 416. In some embodiments, system 400 is part of, and used as an element of, a directed-energy (DE) weapon carried by a vehicle 409 (such as a tank, an aircraft, or a naval vessel).

FIG. 5 is schematic plan view of an optical power-amplifier system 500, according to some embodiments of the present invention. In some embodiments, a plurality of such MOPA laser subsystems 500 are used in each of the SBC systems described above. In some embodiments, system 500 includes a plurality of seed lasers 550 (e.g., in some embodiments, each outputting 5-ns pulses at a repetition rate of 10 MHz (i.e., a repeating series of 5-ns on, 95-ns off)) as the master oscillators, where the output beams are collimated by respective lenses 511 (one for each master oscillator, in some embodiments), are isolated by one or more one-way optical isolators 514 and optionally 515, and enter the corresponding power amplifier 532 through dichroic beamsplitter 520 and focusing lens 530. In some embodiments, power amplifier fiber 532 is a large-mode-area, dual-clad fiber amplifier that is pumped by one or more arrays of pump laser diodes (LDs, not shown) whose light (in some embodiments, about 400 watts or more) enters through fiber 528 to fiber end 526, and through objective lens 524 and off highly reflective mirror 522 towards and reflected by dichroic beamsplitter 520 into the power amplifier fiber 532. The output signal beam and residual pump light exit the fiber 523 towards the right, and are collimated by lens 534 towards dichroic beamsplitter 536, where the residual waste pump light 538 is reflected downward, and the signal 540 is transmitted. In some embodiments, a power-amplifier system 500 is used for each of the power amplifiers 420 of FIG. 4.

In some embodiments, realizing diffraction-limited Spectral Beam Combining (SBC) of multiple high-power fiber lasers requires that each laser possess a spectral width on the order of a few GHz (i.e., a very narrow linewidth; see, e.g., A. Liu, R. Mead, T. Vatter, A. Henderson and R. Stafford, "Spectral beam combining of high power fiber lasers," in Proceedings of SPIE, vol. 5335, 81-88 (2004), incorporated herein by reference) and exhibit diffraction-limited spatial output. Obtaining high-efficiency beam combining and ensuring amplitude stability for the combined beam additionally requires, due to the polarization sensitivity typical of high-power diffraction gratings (see, e.g., M. D. Perry, R. D. Boyd, J. A. Britten, D. Decker, B. W. Shore, C. Shannon, E. Shults, and L. Li, "High-efficiency multilayer dielectric diffraction gratings," Opt. Lett., vol. 20, 940-942 (1995) (and U.S. Pat. No. 5,907,436 entitled "Multilayer dielectric diffraction gratings" issued May 25, 1999 to Perry et al., which are incorporated herein by reference); and Karl Hehl, J. Bischoff, U. Mohaupt, M. Palme, B. Schnabel, L. Wenke, R. Bodefeld, W. Theobald, E. Welsch, R. Sauerbrey and H. Heyer, "High-efficiency dielectric reflection gratings: design, fabrication, and analysis," Appl. Opt., vol. 38, 6257-6271 (1999); incorporated herein by reference) that each laser in the SBC array have a polarization extinction ratio (PER)>>1 and a stable polarization orientation with respect to time. One architecture for MOPAs developed at Aculight (assignee of the present invention) to meet these needs is illustrated in FIG. 5. In some embodiments, the power amplifier 500 includes a polarization-maintaining (PM), large-mode area (LMA) fiber 532 that is pumped at 976 nm with up to 400 W of power (e.g., supplied by a laser-diode array, in some embodiments); the pump-delivery fiber 528 has a core diameter of 600 microns (in some embodiments, having a numeric aperture of 0.22=NA). In some embodiments, LMA fiber 532 is double-clad, with a core diameter of 20 microns (in some embodiments, having a numeric aperture of 0.06=NA) and an inner cladding diameter of 400 microns (in some embodiments, having a numeric aperture of 0.46=NA). In some embodiments, LMA fiber 532 is wound on a water-cooled mandrel for cooling the LMA fiber 532. In some embodiments, the seed beam 521 and pump beam 523 are both coupled (in a direction left-to-right in FIG. 5) via free-space optics 530 into the input facet 531 of the LMA fiber 532, leaving each output end 533 free to be spatially arrayed as required for input to the multi-channel SBC (e.g., 430 of FIG. 4). In some embodiments, the LMA fiber input facet 531 is held in a water-cooled chuck that is mounted on a 5-axis, XYZ, tip/tilt stage; both ends of the fiber 532 have 8-degree angle polishes. In some embodiments, two free-space isolators 514 and 515 protect the seed laser 550 from back-propagating signals generated by the power amplifier 532. Table 1 provides a detailed list of components for one embodiment of the system illustrated in FIG. 5.

TABLE 1

List of components illustrated in FIG. 5. All lenses are anti-reflection coated

| Component | Vendor | Part No. | Description |
|---|---|---|---|
| Objective 1 | ThorLabs | C110TM-B | 6.24 mm focal length molded glass aspheric lens |
| Objective 2 | Special Optics | 54-15-15-980-1080 | 15 mm focal length, fused silica multi-element objective |
| Objective 3 | Special Optics | 54-17-30-980-1080 | 30 mm focal length, fused silica, multi-element objective |
| Isolators | Electro-Optic Technologies | 8I1055-WP | Broadband (1030-1080 nm), free-space optical isolators, >30 dB isolation Two isolators in series |
| Dichroic beam-splitter | Semrock | ACUL-0002 | Beamsplitter that transmits 1040-1080 nm and reflects 980 nm |

Figure 6:
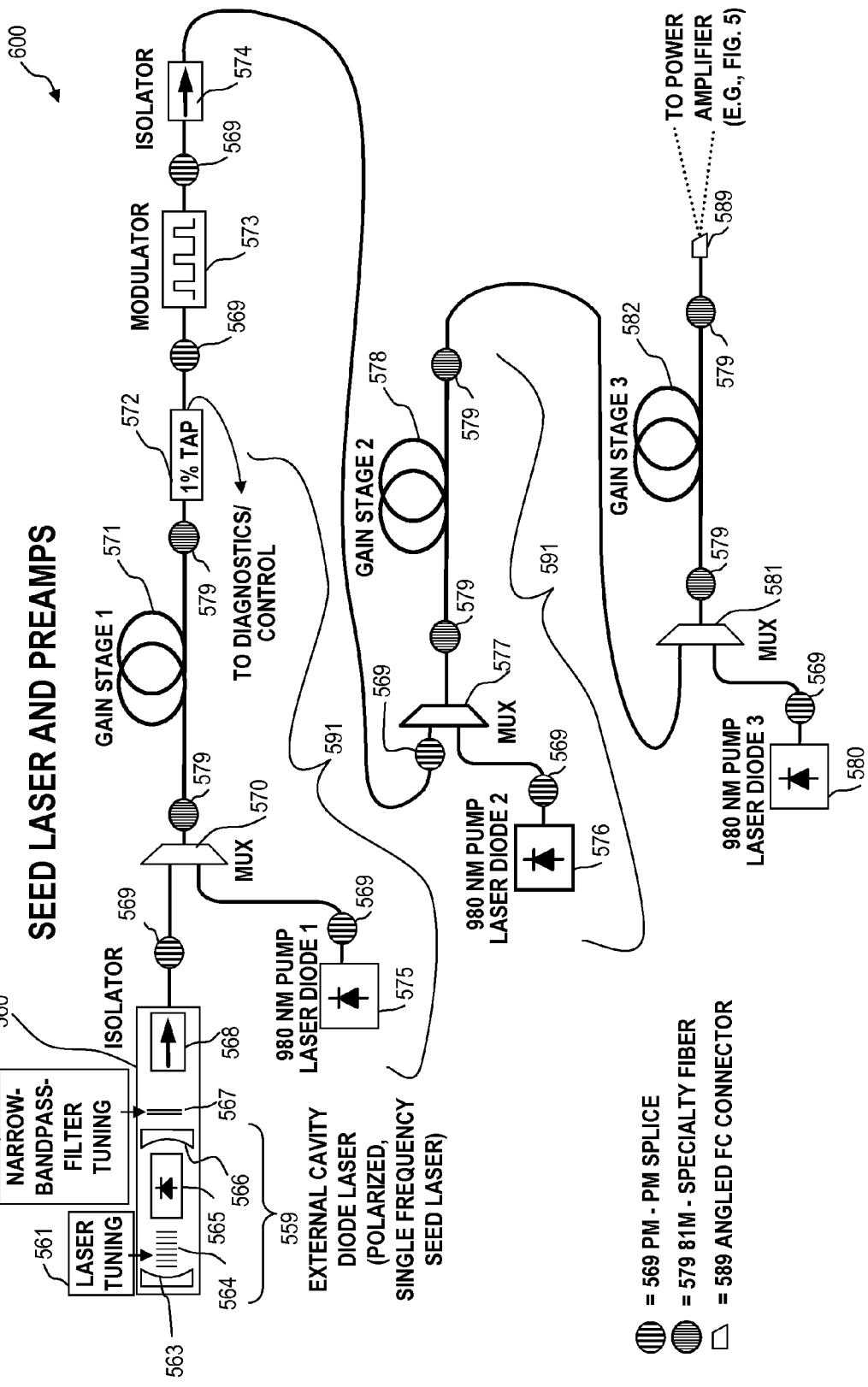
FIG. 6 is a diagram of a MOPA laser subsystem's low-power optical master oscillator system 600, according to some embodiments of the present invention.

FIG. 6 is a diagram of a low-power optical master oscillator system 600, according to some embodiments of the present invention. In some embodiments, the output is pulsed (5-ns pulses at a 10 MHz repetition rate, in order to suppress SBS) and contains >300 mW of average power with a spectral purity of >99.9% and a spectral bandwidth of about 100 MHz. The wavelength is tunable over nearly the entire Yb-gain spectrum. In some embodiments, the seed input 521 to the LMA amplifier 532 of FIG. 5 is provided by the polarized, low-power front-end laser depicted in FIG. 5B. In some embodiments, the seed laser 550 includes a tunable, narrow-band oscillator 560 (in some embodiments, a Littman-Metcalf external-cavity diode laser (ECDL) having cavity reflectors 563 and 566, a laser tuning mechanism 564 to tune the central wavelength, a laser diode 565, a narrow bandpass tunable filter 567, and one or more serially connected optical isolators 568), a Mach-Zehnder modulator 573, and a series of single-mode PM gain stages. The ECDL output is delivered to gain stage 1 via single-mode PM fiber through a PM-PM splice 569. An isolator 568 is integrated into the ECDL housing to protect the laser 560 from optical feedback. In some embodiments, gain stage 1 includes a first pump laser diode 575 connected to one input of multiplexer 570 through a PM-PM splice 569, where the other input to multiplexer 570 through a PM-PM splice 569 is laser 560. The output of multiplexer 570 is connected to gain fiber 571 through a PM-Specialty Fiber splice 579, and the output of gain fiber 571 is connected through a PM-Specialty Fiber splice 579 to a 1% tap 572 that extracts 1% of the signal to be used for diagnostics and/or control (e.g., to control wavelength drift). The output of the 1% tap is coupled through a PM-PM splice 569 to Mach-Zehnder modulator 573, which converts the continuous-wave (cw) optical output from stage 1 to a quasi-cw pulse train (5 ns pulses @ 10 MHz repetition rate) that is designed to suppress Stimulated Brillouin Scattering (SBS) in the LMA power amplifier 500 by providing the narrowband seed on time scales that are short compared to the about 10 ns SBS build-up time (see G. P. Agrawal, Nonlinear Fiber Optics, 3rd ed. (Academic, New York, 2001)).

Subsequent amplification in gain stages two and three then increases the average signal power to >300 mW. In some embodiments, the output of modulator 573 is connected through a PM-PM splice 569 to optical isolator 574, and then through a PM-PM splice 569 to one input of multiplexer 577 through a PM-PM splice 569, where the other input to multiplexer 577 is connected to a second pump laser diode 576 through a PM-PM splice 569. The output of multiplexer 577 is connected to gain fiber 578 through a PM-Specialty Fiber splice 579, and the output of gain fiber 578 is connected through a PM-Specialty Fiber splice 579 to one input of multiplexer 581, where the other input to multiplexer 581 is connected to the output of a third pump laser diode 580 through a PM-PM splice 569. The output of multiplexer 581 is connected to gain fiber 582 through a PM-Specialty Fiber splice 579, and the output of gain fiber 582 is connected through a PM-Specialty Fiber splice 579 to output coupling 589, which couples the light to power amplifier 500. The 1% tap coupler 572, inserted between gain stage 1 and the Mach-Zehnder modulator 574, taps a portion of the signal to be used to monitor and/or control the ECDL fiber coupling and the frequency stability of the ECDL output. Table 2 below provides a detailed list of the components used for some embodiments of the front-end seed laser.

TABLE 2

| Component | Vendor | Part No. | Description |
|---|---|---|---|
| External Cavity Diode Laser (ECDL) 559 | Sacher Lasertechnik | SYS-500-1060-30 | 1055 nm center wavelength ± 20 nm tuning range 30 mW power, CW, linear polarization |
| ECDL fiber coupling module | Sacher Lasertechnik | FC-SMF-BCO | Single-mode fiber coupling with anamorphic beam correction Integrated into ECDL housing |
| ECDL optical isolator 568 | Sacher Lasertechnik | ISO-35-1060 | 35 dB optical isolator Integrated into ECDL housing |
| 980-nm $1^{st}$ pump diode 575 | JDS Uniphase | 26-7602-180 | 180 mW fiber-coupled diode laser @ 976 nm |
| 980-nm $2^{nd}$ pump diode 576 | JDS Uniphase | 29-7602-400 | 400 mW, fiber-coupled diode laser @ 976 nm |
| 980-nm $3^{rd}$ pump diode 580 | JDS Uniphase | 29-7602-500 | 500 mW, fiber-coupled diode laser @ 976 nm |
| MUX 570, 577, 581 | Novawave | PMFWDM-9806-N-B-Q | Polarization maintaining wavelength division multiplexer, 980 pass/1060 reflect |
| 1% Tap 572 | Novawave | PMFC-06-1-01-N-B-P-Q-F | Polarization maintaining 1% tap coupler |
| Modulator 573 | The Cutting Edge | AM.10.03.H.PP.B.A | Polarization maintaining, Electro-optic amplitude modulator |
| Isolator 574 | Novawave | PMI-1-06-P-N-B-Q | 1064 nm polarization maintaining optical isolator |
| $1^{st}$ Gain Stage 571 | INO | YB 500 | Polarization maintaining, single-mode, Yb-doped optical fiber, 5 meters long |

TABLE 2-continued

| Component | Vendor | Part No. | Description |
|---|---|---|---|
| 2$^{nd}$ Gain Stage 578 | INO | YB 500 | Polarization maintaining, single-mode, Yb-doped optical fiber, 10 meters long |
| 3$^{rd}$ Gain Stage 582 | INO | YB 500 | Polarization maintaining, single-mode, Yb-doped optical fiber, 2 meters long |

The wavelength tuning range for the front-end output is set by the tuning range for the ECDL, which, in some embodiments, provides single longitudinal mode output for wavelengths spanning about 1040 nm to about 1080 nm (corresponding to a significant fraction of the Yb gain bandwidth). This feature utilizes one of the primary strengths for SBC, namely the ability to combine a large number of channels spanning a broad range of wavelengths.

Broad range (>200 nm) spectral measurements of the front-end seed-laser output for some embodiments indicate that about 97.5% of the output power is contained in the narrowband signal, with the remaining about 2.5% emitted as broadband amplified spontaneous emission (ASE). To ensure a spectrally clean seed for the LMA power amplifiers, in some embodiments, the unwanted ASE component is removed with a custom interference filter 567 (in some embodiments, this provides 0.7 nm full-width at half-maximum spectral bandwidth, such as a device available from BARR Associates Inc, quotation no. 0507-1028CQ) placed immediately after the front-end output. The center wavelength for the filter can be angle tuned from less than 1055 nm to more than 1080 nm, leads to negligible signal loss over this range, and improves the front-end spectral purity to more than 99.9%. The resulting output spectrum is shown in FIG. 6A.

FIG. 7A is a schematic plan view of a spectral-beam-combiner laser system 701, optionally using wavelength-dispersion compensation, that spectrally beam combines an array of laser beams and performs beam diagnostics and control, according to some embodiments of the present invention. In some embodiments, system 701 includes a plurality of MOPA fiber lasers, each having a master oscillator seed laser 600 tuned to a different wavelength followed by its own fiber power amplifier 500. The laser-beam outputs of the plurality of MOPA lasers are combined into a single beam using a spectral beam combiner 130, as described above. In some embodiments, each laser is pulsed on a schedule controlled by pulse-timing circuit 781, while in other embodiments, continuous-wave (CW) lasing is used. In some embodiments, the pump lasers are supplied by one or more pump-laser-diode power supplies 794 and 792. In some embodiments, the fibers of the power amplifiers are wound around a water-cooled mandrel cooled by fiber-cooling water supply 793. In other embodiments, other suitable cooling mechanisms are used, such as air cooling, or refrigerant cooling.

Note that, in general, if the two gratings of the SBC are kept parallel, then each component of the output beam 90' will be parallel to its respective input beam from one of the power amplifiers 500, and thus as a laser's wavelength drifts (i.e., changes over time due to, e.g., temperature changes of the linewidth-narrowing filter) the portion of output beam 90' due to that laser, while remaining parallel to the main output beam 90', will move off center of main output beam 90'. In some embodiments, a real-time diagnostic-and-adjustment unit 709 is used to dynamically adjust the wavelengths of the individual lasers in order that every laser's beam is centered in the single output beam 90'.

In some embodiments, beam centering is accomplished by detecting whether the particular beam is parallel but not aligned (i.e., the beam does not hit the single spot on the second diffraction grating to which the other beams are directed) into the single output beam 90', for example, using a detector 711 (e.g., that receives light only if a beam is too high) and a detector 712 (e.g., that receives light only if a beam is too low), both of which are connected to off-axis circuit 741. In some embodiments, off-axis circuit 741 includes an output 743 that is connected to and analyzed by real-time wavelength-drift diagnostic circuit 796, whose output 745 controls individual wavelength adjustment circuits 787 (e.g., in some embodiments, these control, for example, the resonant wavelength of the initial seed laser or its output filter) for each laser output. In some embodiments, circuit 796 has one or more inputs 784 that are connected to receive pulse timing information (e.g., from pulse timing circuit 795), in order to determine which laser needs its wavelength adjusted. In some embodiments, circuit 796 has outputs (not shown) that are connected to transmit pulse timing information (e.g., to pulse timing circuit 795), in order to control pulse timing and/or laser power, in order to determine which laser needs its wavelength adjusted.

Thus, if the wavelength of one of the seed lasers drifts, its output, while remaining parallel, will also drift off center, and real-time diagnostic-and-adjustment unit 708 detects which of the lasers is off-center and automatically adjusts its wavelength until its portion of the output beam is again centered. In some embodiments, off-axis circuit 741 optionally includes an output that controls individual positioners (e.g., in some embodiments, five-degrees-of-freedom positioners that control, for example, X, Y, Z, pitch angle, and yaw angle) for each laser's output (the input to SBC 130). In some embodiments, a combination of wavelength control and positioning control is used to keep all beams parallel and aligned into the single output beam 90' by iteratively adjusting angle (using five-degrees-of-freedom positioners) and position (using laser wavelength and/or the five-degrees-of-freedom positioners) on each beam.

Note that, if the two gratings of the SBC are kept parallel, then each component of the output beam 90' will be parallel to its respective input beam from one of the power amplifiers 500, so if one of the input beams is not parallel (i.e., that beam strikes the first diffraction grating at an angle different than the angle of the other input beams), its portion of the output beam will also not be parallel and will diverge at an angle from the main output beam 90' corresponding to the angle error of the input beam and a correction will be needed. In some embodiments, this is accomplished by detecting whether the particular beam is initially aligned into the single spot on the second grating, but is angled too high, for example, using detectors (e.g., one that receives light only if a beam is angled too high, and/or one that receives light only if a beam is angled too low), both of which are connected to off-angle (angle positioning) detector and diagnostic circuit 741, which detects which input laser beam is off-angle, and whose output controls the individual positioners (e.g., in some embodiments, five-degrees-of-freedom positioners that control, for example, X, Y, Z, pitch angle, and yaw angle) for each laser's output (the input to SBC 130). In some embodiments, off-angle (angle positioning) detector and diagnostic circuit 741 also includes an output signal that is used in combination with the other inputs by diagnostic circuit 796 to control the wavelengths of the seed lasers. In some embodiments, circuit 741 has inputs (not shown) that are connected to receive pulse timing information (e.g., from pulse timing circuit 795), in order to determine which laser needs its angle adjusted. In some embodiments, circuit 741 has outputs (not shown) that are connected to transmit pulse timing information (e.g., to pulse timing circuit 795), in order to control pulse timing and/or laser power, in order to determine which laser needs its angle adjusted.

In some embodiments, the other beams (those not being adjusted) can be fully on (either CW or at their normal pulse schedule) while the adjustments are made to the particular beam of interest. In some embodiments, the particular beam of interest is turned on or off, or its power is increased or decreased, and the detection circuit 741 detect whether a corresponding change in the off-axis or off-angle signal is observed. This is a major advantage of the present invention for those circumstances where it is desired to adjust the laser system's parameters (i.e., the wavelength of one or more beams) while keeping all of the other beams operating and thus maintaining nearly full output power of the combined beam 90'. The flowchart of one such process according to the present invention is shown in FIG. 7B.

Figure 7C:
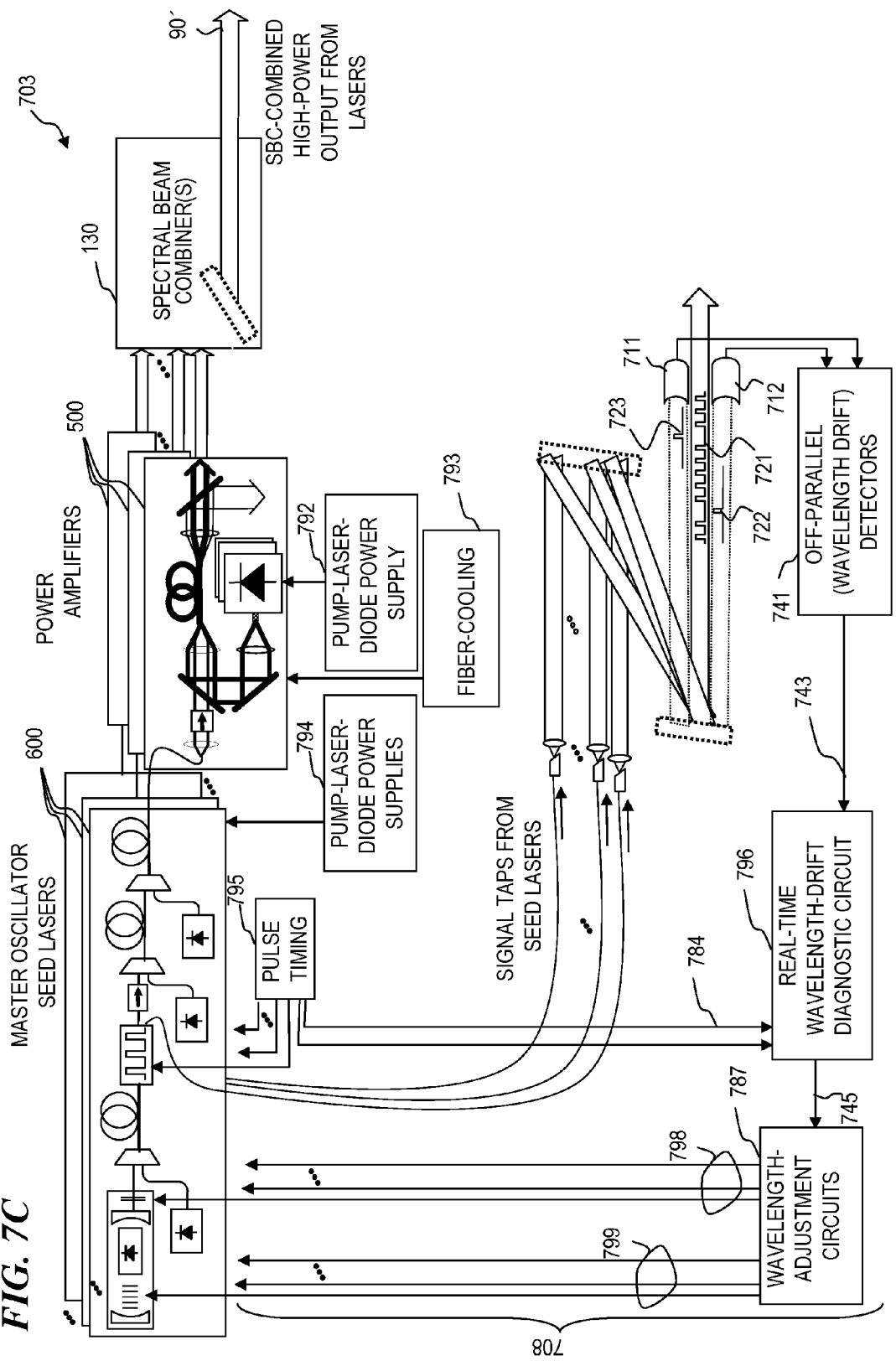
FIG. 7C is a diagram of a system 703 that spectrally beam combines an array of laser beams and performs beam diagnostics and control, according to some embodiments of the present invention.

FIG. 7B is a flowchart of a real-time diagnostic and adjustment process 702 according to some embodiments of the invention. In some embodiments, the process starts at block 771, and at block 772, the process detects that one or more beams is off-axis and/or off-angle. At block 773, one of the plurality of lasers is selected, and that laser is turned on or off, and/or its power is increased or decreased, and at decision-block 774 the process either: if no change was detected in the off-axis and/or off-angle signal, then branches back to block 773 to select the next laser and that laser is turned on or off, and/or its power is increased or decreased; or if a corresponding change was detected in the off-axis and/or off-angle signal, then branches to block 775, where the wavelength and/or position of the selected laser is adjusted and control passes to block 776 and this laser is again turned on or off, and/or its power is increased or decreased and control passes again to decision block 774 to iterate until the selected laser is adjusted and aligned. This entire process is repeated for every laser beam. If process 701 detects that two or more beams are off-axis and/or off-angle (e.g., if the on-off action is performed for each single laser and the off-axis and/or off-angle signal does not detect a change (e.g., the off-axis and/or off-angle signal stays on of two lasers are off-axis and/or off-angle, since when one laser is cycled on and off, the other laser remains on and saturates the detectors 711-712), then the process turns off one or more of the other lasers while testing the particular selected laser until a single off-axis and/or off-angle beam can be adjusted by itself, whereupon one of the other lasers can be turned back on and the adjustment process continued. In some embodiments, the process of FIG. 7B is performed for any of the embodiments described herein, including (but not limited to) those of FIG. 7A and FIG. 7C.

FIG. 7C is a schematic plan view of a spectral-beam-combiner laser system 703 with optional wavelength-dispersion compensation. System 703 is substantially similar to system 701 of FIG. 7A, except that a separate off-wavelength detector/adjuster 708 is used on laser beams of a plurality of the master oscillators 600 before the power amplifiers, in order that the wavelengths of the master oscillators 600 (the seed lasers) can be continuously monitored and adjusted without or before turning on the power amplifiers, in order that when the power amplifiers are turned on, all of the wavelengths will be stable and aligned to the desired wavelengths. In some embodiments, each laser is activated during only one pulse of a stream of pulses (e.g., if one hundred lasers each having a different wavelength are provided, and each laser is active for a $1/100$ duty cycle that is staggered with the other lasers, then a substantially continuous output laser beam can be provided). For example, if a first laser (A) is activated during the third pulse 722 of a pulse stream 721 and its pulse corresponds to a pulse detected by lower detector 712, then its wavelength will be adjusted (e.g., by shortening the wavelength) until its beam is again aligned with the main beam and not detected by lower detector 712. Similarly, for example, if a second laser (B) is activated during the ninth pulse 723 of pulse stream 721 and its pulse corresponds to a pulse detected by upper detector 711, then its wavelength will be adjusted (e.g., by lengthening the wavelength) until its beam is again aligned with the main beam and not detected by upper detector 711. In some embodiments, circuit 703 also includes off-angle and/or off-axis detectors and diagnostic circuits associated with its output beam 90' as shown in FIG. 7A. In some embodiments, this configuration allows the diagnostics portion in the upper part of FIG. 7C to be placed in a location remote from the high-power portion of the lower part of FIG. 7C, where space can be at a premium and heat interactions can be a problem (e.g., heat from the power amplifiers can interfere with the wavelength diagnostics and control).

In some embodiments, the present invention provides an apparatus that includes an output diffractive element; a source of a plurality of substantially monochromatic light beams directed from different angles to a single location on the output diffractive element, wherein the output diffractive element spectrally combines the plurality of light beams into a single beam, and wherein the plurality of light beams includes a first light beam having a first central wavelength and a second light beam having a second central wavelength different than the first central wavelength; a first adjustment apparatus configured to set an adjustable characteristic of the first light beam; a second adjustment apparatus configured to set an adjustable characteristic of the second light beam; a detector configured to detect whether one of the light beams has become misadjusted, wherein the detector includes a plurality of light sensors and an imaging device that focuses the plurality of light beams onto the plurality of light sensors; a diagnoser operatively connected to receive signals from the plurality of light sensors configured to determine whether the first light beam is the misadjusted one and if so, to control the first adjustment apparatus to adjust the adjustable characteristic of the first light beam in order that the first light beam becomes improved relative to the single combined beam. In some embodiments, the misadjustment being corrected is a misalignment of a fiber end. In some embodiments, the misadjustment being corrected is a wavelength drift of a laser signal wavelength. In some embodiments, the misadjustment being corrected is a power level of a fiber laser output. In some embodiments, the first light beam is a laser beam.

In some embodiments of the apparatus, the source of a plurality of light beams includes a plurality of master-oscillator power-amplifier (MOPA) fiber lasers, each having a master-oscillator seed laser and a power amplifier, each seed laser tuned to a different wavelength. In some such embodiments, the plurality of light sensors sense light from the seed lasers of the plurality of MOPA fiber lasers before that light is amplified by the power amplifiers of the plurality of MOPA fiber lasers.

In some embodiments of the apparatus, the detector includes a diagnostic diffractive element configured to spatially separate a portion of the light from the plurality of substantially monochromatic light beams that was combined by the output diffractive element.

Some embodiments of the apparatus further include a focussing mirror, wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

Some embodiments of the apparatus further include a focussing mirror and an input diffractive element, and wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is substantially parallel to the collimated light of the other ones of the plurality of substantially monochromatic light beams, such that the plurality of collimated substantially monochromatic light beams impinge at equal angles onto the input diffractive element, and the input diffractive element diffracts each beam at a different angle such that the plurality of collimated substantially monochromatic light beams converge at different angles to a single area of the output diffractive element.

In some embodiments of the apparatus, the detector includes a diagnostic diffractive element configured to spatially separate a portion of the light from the plurality of substantially monochromatic light beams that was combined by the output diffractive element, the apparatus further comprising a focussing mirror, and wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

In some embodiments, the present invention provides a method that includes providing a plurality of fiber lasers that generate laser beams at a plurality of substantially monochromatic light wavelengths including a first fiber that generates a first laser beam at a first wavelength and a second fiber that generates a second laser beam at a second wavelength; spectrally combining the plurality of laser beams into a single output beam; setting an adjustable characteristic of the first fiber to generate the first laser beam at a first wavelength; setting an adjustable characteristic of the second fiber to generate the second laser beam at a second wavelength; detecting that one of the laser beams has become misadjusted relative to the single combined beam; determining that the first laser beam is the misadjusted one and if so, adjusting the adjustable characteristic of the first laser beam in order that the first laser beam is improved (more correctly adjusted relative to the others of the plurality of laser beams, e.g., adjusted such that the total power in the far-field of the single output beam is increased or maximized under the current operating conditions) relative to the single combined beam. In some embodiments, the misadjustment being corrected is a misalignment of a fiber end. In some embodiments, the misadjustment being corrected is a wavelength drift of a laser signal wavelength. In some embodiments, the misadjustment being corrected is a power level of a fiber laser output. In some embodiments, the setting of the adjustable characteristic includes wavelength tuning the respective fiber laser.

In some embodiments of the method, the plurality of fiber lasers includes a plurality of master-oscillator power-amplifier (MOPA) fiber lasers, each having a master-oscillator seed laser and a power amplifier, each seed laser tuned to a different wavelength. In some such embodiments, the detecting that one of the laser beams has become misadjusted relative to the single combined beam includes sensing light from the seed lasers of the plurality of MOPA fiber lasers before that light is amplified by the power amplifiers of the plurality of MOPA fiber lasers.

In some embodiments of the method, the detecting that one of the laser beams has become misadjusted relative to the single combined beam includes diffracting to spatially separate a portion of the light from the single output beam into a spatially separated plurality of substantially monochromatic diagnostic light beams.

Some embodiments of the method further include providing an output diffractive element, wherein the spectrally combining of the plurality of laser beams into the single output beam further includes emitting light from an array of endcaps of the plurality of fiber lasers; and reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

Some embodiments of the method further include providing an input diffractive element and an output diffractive element, wherein the spectrally combining of the plurality of laser beams into the single output beam further includes emitting light from an array of endcaps of the plurality of fiber lasers; reflectively focussing and collimating each one of the plurality of substantially monochromatic laser beams into a substantially parallel beam of light that is substantially parallel to the collimated light of the other ones of the plurality of substantially monochromatic light beams, such that the plurality of collimated substantially monochromatic light beams impinge at equal angles onto the input diffractive element; and diffracting each beam at a different angle from the input diffractive element such that the plurality of collimated substantially monochromatic light beams converge at different angles onto a single area of the output diffractive element.

Some embodiments of the method further include providing a diagnostic diffractive element and an output diffractive element, wherein the spectrally combining of the plurality of laser beams into the single output beam further comprises reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element; and wherein the detecting that one of the laser beams has become misadjusted relative to the single combined beam further comprises using the diagnostic diffractive element, spatially separating a portion of the light from the plurality of substantially monochromatic light beams that was combined by the output diffractive element.

In some embodiments, the present invention provides an apparatus that includes a plurality of fiber lasers that generate laser beams at a plurality of substantially monochromatic light wavelengths including a first fiber that generates a first laser beam at a first wavelength and a second fiber that generates a second laser beam at a second wavelength; means for spectrally combining the plurality of laser beams into a single output beam; means for setting an adjustable characteristic of the first fiber to generate the first laser beam at a first wavelength; means for setting an adjustable characteristic of the second fiber to generate the second laser beam at a second wavelength; means for detecting that one of the laser beams has become misadjusted relative to the single combined beam; means for determining that the first laser beam is the misadjusted one; and means for adjusting the adjustable characteristic of the first fiber in order that the first laser beam is improved (more correctly adjusted relative to the others of the plurality of laser beams) relative to the single combined beam. In some embodiments, the misadjustment being corrected is a misalignment of a fiber end. In some embodiments, the misadjustment being corrected is a wavelength drift of a laser signal wavelength. In some embodiments, the misadjustment being corrected is a power level of a fiber laser output. In some embodiments, the means for adjusting of the adjustable characteristic includes means for wavelength tuning the respective fiber laser.

In some embodiments, the plurality of fiber lasers includes a plurality of master-oscillator power-amplifier (MOPA) fiber lasers, each having a master-oscillator seed laser and a power amplifier, each seed laser tuned to a different wavelength. In some such embodiments, the means for detecting that one of the laser beams has become misadjusted relative to the single combined beam includes means for diffracting to spatially separate a portion of the light from the single output beam into a spatially separated plurality of substantially monochromatic diagnostic light beams.

In some embodiments, the means for detecting that one of the laser beams has become misadjusted relative to the single combined beam includes means for diffracting to spatially separate a portion of the single output beam into a spatially separated plurality of substantially monochromatic diagnostic light beams.

Some embodiments further include an output diffractive element, wherein the means for spectrally combining of the plurality of laser beams into the single output beam further includes means for emitting light from an array of endcaps of the plurality of fiber lasers; and means for reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

Some embodiments further include an output diffractive element, wherein the means for spectrally combining of the plurality of laser beams into the single output beam further comprises reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element; and wherein the means for detecting that one of the laser beams has become misadjusted relative to the single combined beam further comprises means for spatially separating a portion of the light from the plurality of substantially monochromatic light beams that was combined by the output diffractive element.

Some embodiments further include an input diffractive element and an output diffractive element, wherein the means for spectrally combining of the plurality of laser beams into the single output beam further includes: means for emitting light from an array of endcaps of the plurality of fiber lasers; means for reflectively focussing and collimating each one of the plurality of substantially monochromatic laser beams into a substantially parallel beam of light that is substantially parallel to the collimated light of the other ones of the plurality of substantially monochromatic light beams, such that the plurality of collimated substantially monochromatic light beams impinge at equal angles onto the input diffractive element; and means for diffracting each beam at a different angle from the input diffractive element such that the plurality of collimated substantially monochromatic light beams converge at different angles onto a single area of the output diffractive element.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   an output diffractive element;
   a source of a plurality of substantially monochromatic light beams directed from different angles to a single location on the output diffractive element, wherein the output diffractive element spectrally combines the plurality of light beams into a single combined beam, and wherein the plurality of light beams includes a first light beam having a first central wavelength and a second light beam having a second central wavelength different than the first central wavelength;
   a first adjustment apparatus configured to set an adjustable characteristic of the first light beam;
   a second adjustment apparatus configured to set an adjustable characteristic of the second light beam;
   a detector configured to detect whether one of the light beams has become misadjusted, wherein the detector includes a plurality of light sensors and an imaging device that focuses the plurality of light beams onto the plurality of light sensors;
   a diagnoser operatively connected to receive signals from the plurality of light sensors, and configured to determine whether the first light beam is the misadjusted one and if so, to control the first adjustment apparatus to adjust the adjustable characteristic of the first light beam in order that the first light beam becomes aligned relative to the single combined beam.

2. The apparatus of claim 1, wherein the source of a plurality of light beams includes a plurality of master-oscillator power-amplifier (MOPA) fiber lasers, each having a master-oscillator seed laser and a power amplifier, each seed laser tuned to a different wavelength.

3. The apparatus of claim 2, wherein the plurality of light sensors sense light from the seed lasers of the plurality of MOPA fiber lasers before that light is amplified by the power amplifiers of the plurality of MOPA fiber lasers.

4. The apparatus of claim 1, wherein the detector includes a diagnostic diffractive element configured to spatially separate a portion of the light from the single combined beam.

5. The apparatus of claim 1, further comprising a focussing mirror, wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

6. The apparatus of claim 1, further comprising a focussing mirror and an input diffractive element, and wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is substantially parallel to the collimated light of the other ones of the plurality of substantially monochromatic light beams, such that the plurality of collimated substantially monochromatic light beams impinge at equal angles onto the input diffractive element, and the input diffractive element diffracts each beam at a different angle such that the plurality of collimated substantially monochromatic light beams converge at different angles to a single area of the output diffractive element.

7. The apparatus of claim 1, wherein the detector includes a diagnostic diffractive element configured to spatially separate a portion of the light from the plurality of substantially monochromatic light beams that was combined by the output diffractive element, the apparatus further comprising a focussing mirror, and wherein the source of the plurality of substantially monochromatic light beams includes a plurality of fiber lasers that emit light from an array of endcaps toward the focussing mirror, and wherein the focussing mirror collimates each one of the plurality of substantially monochromatic light beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

8. A method comprising:
providing a plurality of fiber lasers that generate a plurality of laser beams, wherein each of the plurality of laser beams is at one of a plurality of substantially monochromatic light wavelengths, the plurality of fiber lasers including a first fiber laser that generates a first laser beam at a first wavelength and a second fiber laser that generates a second laser beam at a second wavelength;
spectrally combining the plurality of laser beams into a single combined beam;
setting an adjustable characteristic of the first fiber to generate the first laser beam at a first wavelength;
setting an adjustable characteristic of the second fiber to generate the second laser beam at a second wavelength;
detecting that one of the laser beams has become misadjusted relative to the single combined beam, wherein the detecting includes focussing an image of the plurality of light beams onto a plurality of light sensors;
determining that the first laser beam is the misadjusted one; and
changing the adjustable characteristic of the first fiber laser in order that the first laser beam is improved relative to the single combined beam.

9. The method of claim 8, wherein the plurality of fiber lasers includes a plurality of master-oscillator power-amplifier (MOPA) fiber lasers, each having a master-oscillator seed laser and a power amplifier, each seed laser tuned to a different wavelength.

10. The method of claim 9, wherein detecting that one of the laser beams has become misadjusted relative to the single combined beam includes sensing light from the seed lasers of the plurality of MOPA fiber lasers before that light is amplified by the power amplifiers of the plurality of MOPA fiber lasers.

11. The method of claim 8, wherein the detecting that one of the laser beams has become misadjusted relative to the single combined beam includes diffracting to spatially separate a portion of the light from the single combined beam into a spatially separated plurality of substantially monochromatic diagnostic light beams.

12. The method of claim 8, further comprising:
providing an output diffractive element,
wherein the spectrally combining of the plurality of laser beams into the single combined beam further comprises:
emitting light from an array of endcaps of the plurality of fiber lasers; and
reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

13. The method of claim 8, further comprising:
providing an input diffractive element and an output diffractive element,
wherein the spectrally combining of the plurality of laser beams into the single output beam further comprises:
emitting light from an array of endcaps of the plurality of fiber lasers;
reflectively focussing and collimating each one of the plurality of substantially monochromatic laser beams into a substantially parallel beam of light that is substantially parallel to the collimated light of the other ones of the plurality of substantially monochromatic light beams, such that the plurality of collimated substantially monochromatic light beams impinge at equal angles onto the input diffractive element; and
diffracting each beam at a different angle from the input diffractive element such that the plurality of collimated substantially monochromatic light beams converge at different angles onto a single area of the output diffractive element.

14. The method of claim 8, further comprising:
providing a diagnostic diffractive element and an output diffractive element,
wherein the spectrally combining of the plurality of laser beams into the single output beam further comprises reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element; and
wherein the detecting that one of the laser beams has become misadjusted relative to the single combined beam further comprises using the diagnostic diffractive element, spatially separating a portion of the light from the plurality of substantially monochromatic light beams that was combined by the output diffractive element.

15. An apparatus comprising:
a plurality of fiber lasers that generate a plurality of laser beams, wherein each of the plurality of laser beams is at one of a plurality of substantially monochromatic light wavelengths, the plurality of fiber lasers including a first fiber laser that generates a first laser beam at a first wavelength and a second fiber laser that generates a second laser beam at a second wavelength;
means for spectrally combining the plurality of laser beams into a single combined beam;
means for setting an adjustable characteristic of the first fiber to generate the first laser beam at a first wavelength;
means for setting an adjustable characteristic of the second fiber to generate the second laser beam at a second wavelength;
means for detecting that one of the laser beams has become misadjusted relative to the single combined beam, wherein the means for detecting includes means for focussing an image of the plurality of light beams onto means for sensing light;
means for determining that the first laser beam is the misadjusted one; and
means for changing the adjustable characteristic of the first fiber laser in order that the first laser beam is improved relative to the single combined beam.

16. The apparatus of claim 15, wherein the plurality of fiber lasers includes a plurality of master-oscillator power-amplifier (MOPA) fiber lasers, each having a master-oscillator seed laser and a power amplifier, each seed laser tuned to a different wavelength.

17. The apparatus of claim 15, wherein the single combined beam is a single output beam, and wherein the means for detecting that one of the laser beams has become misadjusted relative to the single combined beam includes means for diffracting to spatially separate a portion of the single output beam into a spatially separated plurality of substantially monochromatic diagnostic light beams.

18. The apparatus of claim 15, further comprising:
an output diffractive element,
wherein the means for spectrally combining of the plurality of laser beams into the single combined beam further comprises:
means for emitting light from an array of endcaps of the plurality of fiber lasers; and
means for reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element.

19. The apparatus of claim 15, further comprising:
an output diffractive element,
wherein the means for spectrally combining of the plurality of laser beams into the single output beam further comprises reflectively focussing and collimating each one of the plurality of substantially monochromatic laser beams into a substantially parallel beam of light that is non-parallel to the collimated light of the other ones of the plurality of substantially monochromatic light beams, such that the plurality of collimated substantially monochromatic light beams converge at different angles to a single area of the output diffractive element; and
wherein the means for detecting that one of the laser beams has become misadjusted relative to the single combined beam further comprises means for spatially separating a portion of the light from the plurality of substantially monochromatic light beams that was combined by the output diffractive element.

20. The apparatus of claim 15, further comprising:
a vehicle, airframe, vessel or facility enclosure;
means for supplying power from the electrical power supply to the source of a plurality of substantially monochromatic light beams; and
means for controlling the plurality of fiber lasers, the first adjustment apparatus and the second adjustment apparatus.

* * * * *